United States Patent
Kusumi et al.

(10) Patent No.: US 12,293,495 B2
(45) Date of Patent: May 6, 2025

(54) IMAGE PROCESSING METHOD, IMAGE PROCESSING APPARATUS, IMAGE PROCESSING SYSTEM, AND MEMORY MEDIUM

(71) Applicant: CANON KABUSHIKI KAISHA, Tokyo (JP)

(72) Inventors: Yuichi Kusumi, Tochigi (JP); Norihito Hiasa, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 304 days.

(21) Appl. No.: 17/838,582

(22) Filed: Jun. 13, 2022

(65) Prior Publication Data

US 2022/0405892 A1  Dec. 22, 2022

(30) Foreign Application Priority Data

Jun. 17, 2021  (JP) ................. 2021-101003

(51) Int. Cl.
 *G06K 9/00* (2022.01)
 *G06T 5/50* (2006.01)
 *G06T 5/73* (2024.01)

(52) U.S. Cl.
 CPC .............. *G06T 5/73* (2024.01); *G06T 5/50* (2013.01); *G06T 2207/20224* (2013.01)

(58) Field of Classification Search
 CPC .... G06T 5/73; G06T 5/50; G06T 2207/20224
 See application file for complete search history.

(56) References Cited

U.S. PATENT DOCUMENTS

| | | | |
|---|---|---|---|
| 8,565,524 B2 | 10/2013 | Hatakeyama et al. | |
| 2016/0371821 A1* | 12/2016 | Hayashi | H04N 23/83 |
| 2018/0061020 A1* | 3/2018 | Hiasa | G06T 3/60 |
| 2018/0197278 A1* | 7/2018 | Lee | G06V 10/443 |
| 2019/0014262 A1* | 1/2019 | Yamaguchi | G06T 7/55 |
| 2020/0285883 A1* | 9/2020 | Hiasa | G06F 18/2148 |
| 2020/0311981 A1 | 10/2020 | Hiasa | |
| 2020/0388014 A1* | 12/2020 | Hiasa | G06N 3/047 |

(Continued)

FOREIGN PATENT DOCUMENTS

| | | | | |
|---|---|---|---|---|
| EP | 3614336 A1 * | 2/2020 | | G06N 3/0454 |
| EP | 3716146 A1 * | 9/2020 | | G06K 9/00523 |
| EP | 3786879 A1 * | 3/2021 | | G06N 20/00 |

(Continued)

OTHER PUBLICATIONS

Convolutional Deblurring for Natural Imaging, Mahdi S. Hosseini et al., IEEE, 2020, pp. 250-264 (Year: 2020).*

(Continued)

*Primary Examiner* — Jayesh A Patel
(74) *Attorney, Agent, or Firm* — ROSSI, KIMMS & McDOWELL LLP

(57) ABSTRACT

An image processing method includes acquiring a captured image obtained by imaging, generating a first image by correcting a blur component of the captured image, and generating a second image based on the captured image, the first image, and weight information. The weight information is generated based on (i) information on brightness of the captured image or information on a scene of the captured image and (ii) information on a saturated area in the captured image.

18 Claims, 17 Drawing Sheets

(56) References Cited

U.S. PATENT DOCUMENTS

| | | | | |
|---|---|---|---|---|
| 2021/0065454 A1* | 3/2021 | Goodrich | ............... | G06N 20/00 |
| 2021/0110190 A1* | 4/2021 | Park | ....................... | H04N 23/73 |

FOREIGN PATENT DOCUMENTS

| | | | | | |
|---|---|---|---|---|---|
| JP | 2018201137 | A | | 12/2018 | |
| JP | 2020166628 | A | | 10/2020 | |
| JP | 2020201540 | A | * | 12/2020 | ............ G06N 20/00 |
| JP | 2021056678 | A | | 4/2021 | |
| WO | 2011121760 | A1 | | 10/2011 | |

OTHER PUBLICATIONS

Deblurring Saturated Night Image With Function-Form Kernel, Haifeng Liu et al., IEEE, 2015, pp. 4637-4650 (Year: 2015).*

Extended European search report issued in European Appln. No. 22179125.4 mailed on Nov. 29, 2022.

Office Action issued in Japanese Appln. No. 2021-101003 mailed on Aug. 23, 2022. English translation provided.

* cited by examiner

IMAGE PROCESSING METHOD, IMAGE PROCESSING APPARATUS, IMAGE PROCESSING SYSTEM, AND MEMORY MEDIUM

BACKGROUND OF THE INVENTION

Field of the Invention

The present invention relates to an image processing method for deblurring an image.

Description of the Related Art

Japanese Patent Laid-Open No. ("JP") 2020-166628 discloses a method of sharpening blur in a captured image by using a convolutional neural network (CNN), which is one of machine learning models. By training the CNN by using a training data set that is generated by blurring an image including a signal value larger than or equal to a luminance saturated value of the captured image, blur can be sharpened while a side effect is reduced even around a luminance saturated area. JP 2020-166628 also discloses a method that adjusts intensity of sharpening by obtaining a weighted mean of a captured image and an estimated image (deblurred image) based on the luminance saturated area.

JP 2018-201137 discloses a method of reducing a stripe-pattern artifact called ringing around a position corresponding to a saturated pixel, by correcting blur of a captured image by deconvolution and combining the obtained corrected image and the captured image. In JP 2018-201137, as a weight in the combining, a combining proportion of the captured image is set to 1 for a saturated pixel, and a combining proportion of the captured image is set to 0 for the other pixel.

With the method disclosed in JP 2020-166628, an edge fall, ringing, etc. may not be suppressed depending on an input image, and these side effects may occur in the estimated image (deblurred image). Specifically, a side effect is likely to occur in a case where an object is greatly blurred due to aberration of the optical system. Conspicuousness of an edge fall that occurs around a luminance saturated area differs depending on brightness of the image. For example, in a bright image captured outdoors during a daytime, an edge fall around a saturated area is conspicuous, but in a dark image such as a night view, an edge fall is inconspicuous.

With the method disclosed in JP 2020-166628 or JP 2018-201137, averaging is performed according to the determined weight regardless of conspicuousness of an edge fall that differs depending on brightness (or a scene) of an image. In other words, if a weighted mean of an input image and an estimated image is obtained, an edge fall conspicuous around a saturated area is reduced in a bright image (bright scene), but in a dark image (dark scene), a correction effect is reduced too much in an area around a saturated area.

SUMMARY OF THE INVENTION

The present invention provides an image processing method, an image processing apparatus, an image processing system, and a memory medium each of which can properly perform deblurring according to brightness or a scene of an image.

An image processing method according to one aspect of the present disclosure includes acquiring a captured image obtained by imaging, generating a first image by correcting a blur component of the captured image, and generating a second image based on the captured image, the first image, and weight information. The weight information is generated based on (i) information on brightness of the captured image or information on a scene of the captured image and (ii) information on a saturated area in the captured image.

An image processing apparatus according to one aspect of the present disclosure includes at least one processor or circuit configured to execute a plurality of tasks including an acquiring task configured to acquire a captured image obtained by imaging, a first generating task configured to generate a first image by correcting a blur component of the captured image, and a second generating task configured to generate a second image based on the captured image, the first image, and weight information. The weight information is generated based on (i) information on brightness of the captured image or information on a scene of the captured image and (ii) information on a saturated area in the captured image.

An image processing system according to one aspect of the present disclosure includes a first apparatus and a second apparatus that are capable of communicating with each other. The first apparatus includes at least one processor or circuit configured to execute a plurality of tasks including a transmitting task configured to transmit, to the second apparatus, a request relating to execution of a process on a captured image obtained by imaging. The second apparatus includes at least one processor or circuit configured to execute a plurality of tasks including a receiving task configured to receive the request, an acquiring task configured to acquire the captured image, a first generating task configured to generate, based on the request, a first image by correcting a blur component of the captured image, and a second generating task configured to generate a second image based on the captured image, the first image, and weight information. The weight information is generated based on (i) information on brightness of the captured image or information on a scene of the captured image and (ii) information on a saturated area in the captured image.

A storage medium storing a computer program that enables a computer to execute the above image processing method also constitute another aspect of the present disclosure.

Further features of the present invention will become apparent from the following description of exemplary embodiments with reference to the attached drawings.

DESCRIPTION OF THE EMBODIMENTS

Figure 1:
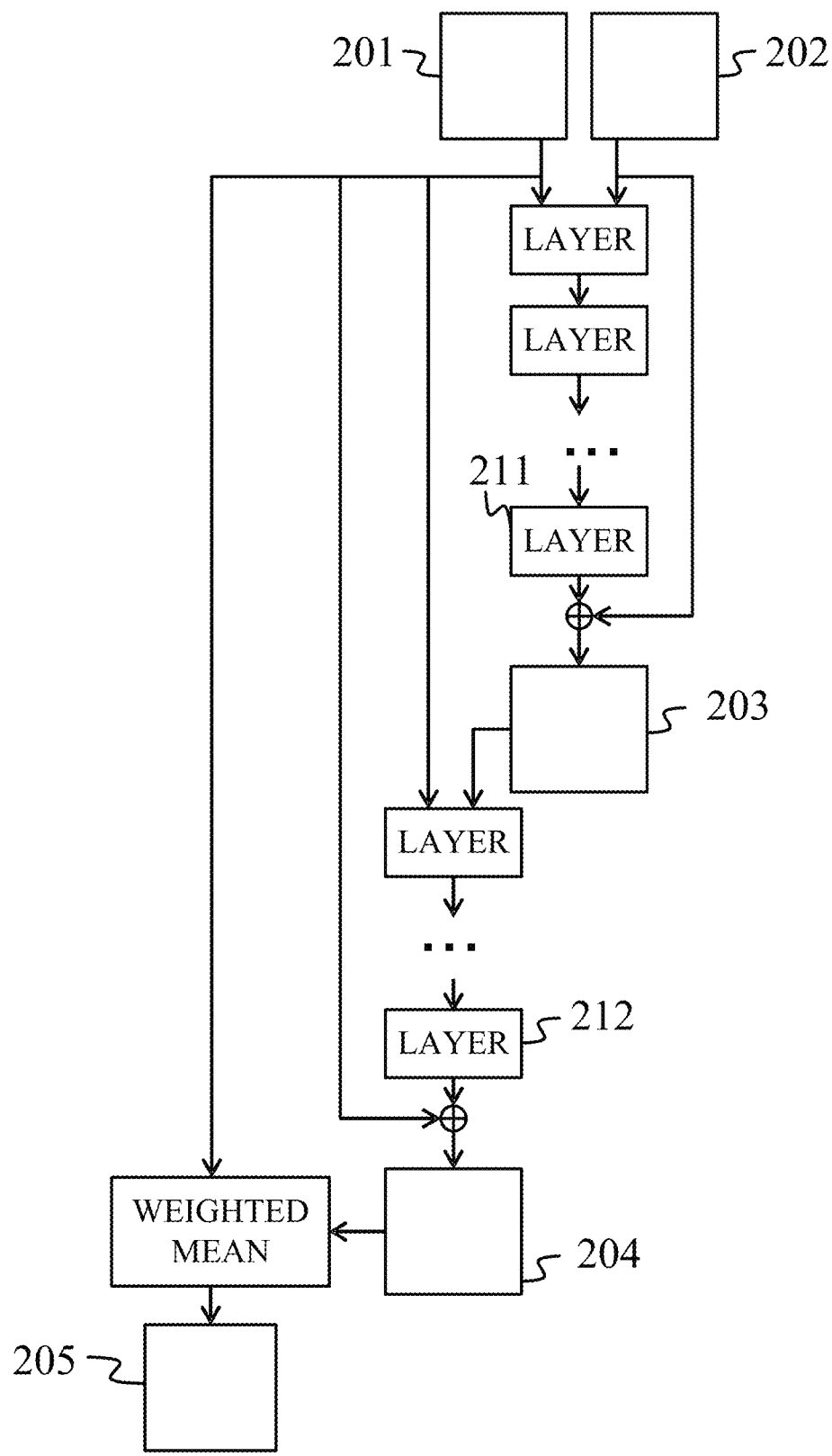
FIG. 1 is a configuration diagram of a machine learning model according to a first embodiment.

Referring now to the accompanying drawings, a description will be given of embodiments according to the present invention. Corresponding elements in respective figures will be designated by the same reference numerals, and a duplicate description will be omitted.

A gist of the present invention is described before a specific description of the embodiments is given. The present invention generates an estimated image (deblurred image, first image) in which blur caused by an optical system (image pickup optical system) is sharpened, from an image captured by using the optical system. The estimated image is generated by, for example, using a machine learning model. Then, the present invention generates a weight map (weight information) based on information on brightness of the captured image or information on a scene of the captured image, and information based on a saturated area (luminance saturated area) in the captured image, and obtains a weighted mean of the captured image and the estimated image. Here, the blur caused by the optical system includes blur caused by aberration, diffraction, and defocus, action by an optical low pass filter, pixel opening deterioration of an image sensor, and the like.

The machine learning model refers to, for example, a neural network, genetic programming, a Bayesian network, or the like. The neural network refers to a convolutional neural network (CNN), a generative adversarial network (GAN), a recurrent neural network (RNN), or the like.

Blur sharpening refers to a process of restoring a frequency component of an object that has been decreased or lost due to blur. During the blur sharpening, undershoot (edge fall), ringing, and the like may not be suppressed depending on the captured image, and these side effects may occur in the estimated image. Specifically, a side effect occurs in a case where the object is greatly blurred due to aberration of the optical system, or in a case where a luminance saturated area exists in an image. The luminance saturated area may occur in the image depending on a dynamic range of the image sensor, exposure during imaging, or the like. In the luminance saturated area, it is not possible to acquire information on a structure of an object space, and therefore a side effect is likely to occur. Conspicuousness of undershoot generated around an area where brightness is saturated differs depending on brightness of an image. For example, in a bright image captured outdoors in a daytime, undershoot is conspicuous around the luminance saturated area, but in a dark image such as a night view, undershoot is not conspicuous.

Therefore, each embodiment obtains a weighted mean of a captured image and an estimated image by using a weight map generated based on information on brightness of the captured image or information on a scene of the captured image, and information based on a saturated area in the captured image. This makes it possible to maintain a deblurring effect (blur correction effect) while a side effect that occurs around the saturation area and is different depending on the brightness or the scene of the captured image.

In the following description, a phase of learning a weight of a machine learning model is referred to as a learning phase, and a phase of sharpening blur with the machine learning model using the learnt weight is referred to as an estimating phase.

First Embodiment

First, a description is given of an image processing system 100 according to the first embodiment of the present invention. In this embodiment, a machine learning model performs blur sharpening on a captured image including luminance saturation. Blur to be sharpened includes blur caused by aberration and diffraction that occur in an optical system and blur caused by an optical low pass filter. However, the effect of the invention can be acquired also in a case where blur caused by pixel opening, defocus, or shake is sharpened. Further, it is possible to carry out the invention and acquire an effect of the invention also in a case where a task other than blur sharpening is performed.

Figure 2:
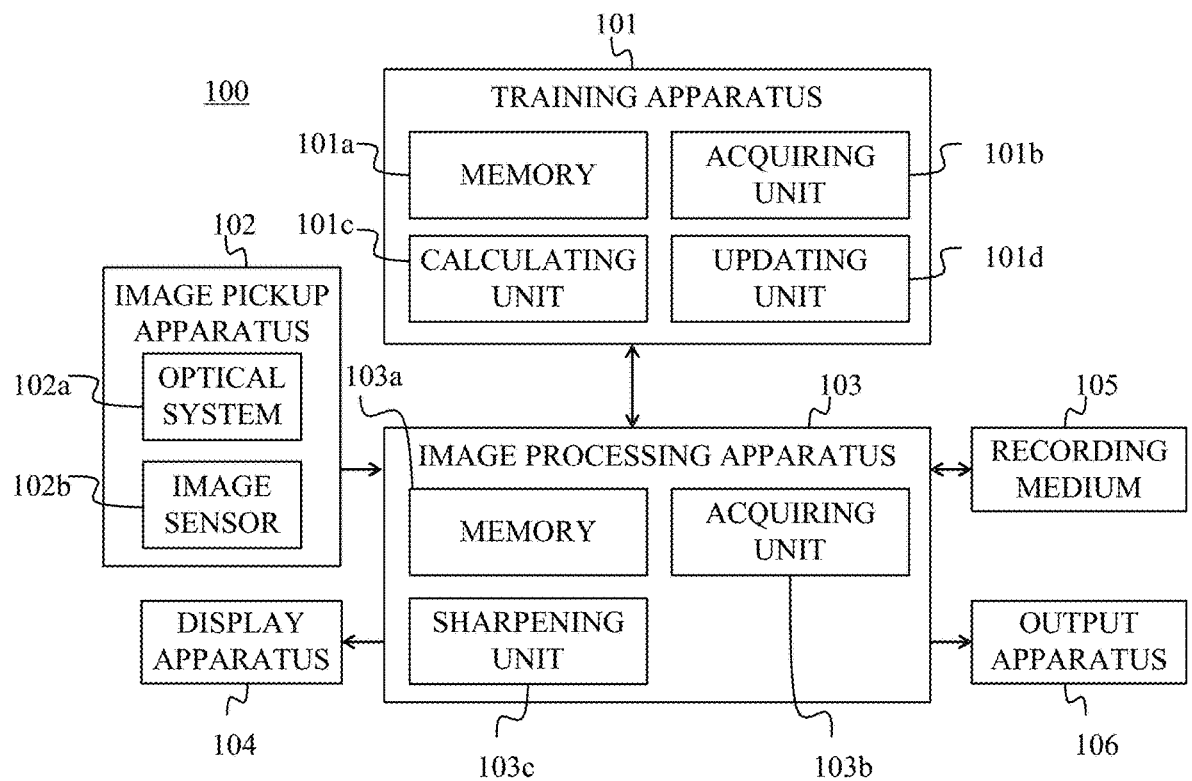
FIG. 2 is a block diagram illustrating an image processing system according to the first embodiment.
Figure 3:
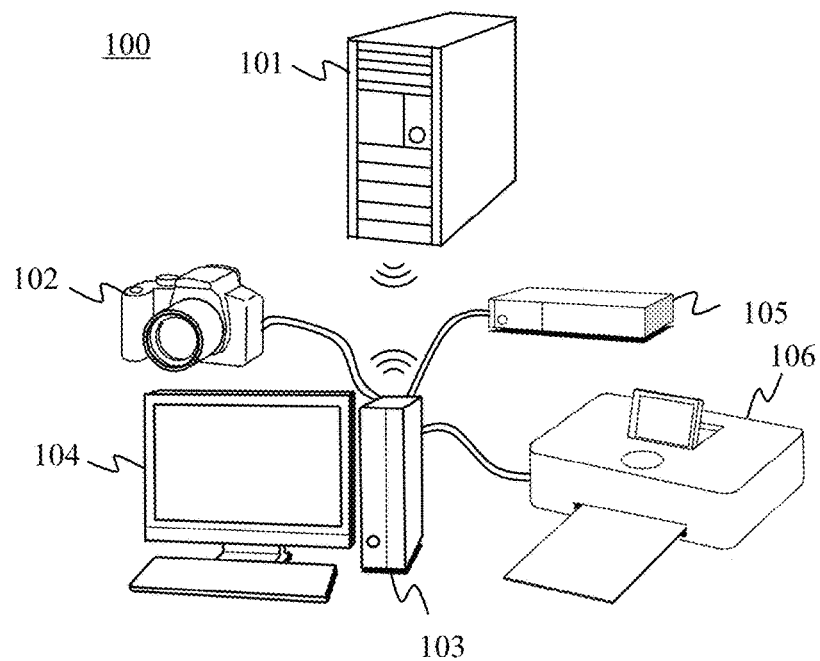
FIG. 3 is an external view illustrating the image processing system according to the first embodiment.

FIG. 2 is a block diagram illustrating the image processing system 100. FIG. 3 is an external view of the image processing system 100. The image processing system 100 includes a training apparatus 101 and an image processing apparatus 103 that are connected via a wired or wireless network. The image processing apparatus 103 is connected to each of an image pickup apparatus 102, a display apparatus 104, a recording medium 105, and an output apparatus 106 via a wired or wireless network. A captured image acquired by imaging an object space using the image pickup apparatus 102 is input to the image processing apparatus 103. The captured image is blurred by aberration and diffraction of an optical system (image pickup optical system) 102a of the image pickup apparatus 102 and an optical low pass filter of an image sensor 102b of the image pickup apparatus 102, and the information on an object is decreased.

By using a machine learning model, the image processing apparatus 103 performs blur sharpening on the captured image and generates a saturation effect map and a deblurred image (model output, first image). A detailed description of the saturation effect map will be given later. The machine learning model has been trained by the training apparatus 101, and the image processing apparatus 103 has acquired information on the machine learning model from the training apparatus 101 in advance and has stored it in a memory 103a. The image processing apparatus 103 also has a function of adjusting intensity of the blur sharpening by obtaining a weighted mean of the captured image and the deblurred image. A detailed description will be given later of the training and estimation by the machine learning model, and the intensity adjustment of blur sharpening. A user can adjust the intensity of the blur sharpening while checking an image displayed on the display apparatus 104. The intensity-adjusted deblurred image is stored in the memory 103a or the recording medium 105, and is output to the output apparatus 106 such as a printer as needed. The captured image may be grayscale or may have a plurality of color components. Alternatively, an undeveloped RAW image or a developed image may be used.

Figure 4A:
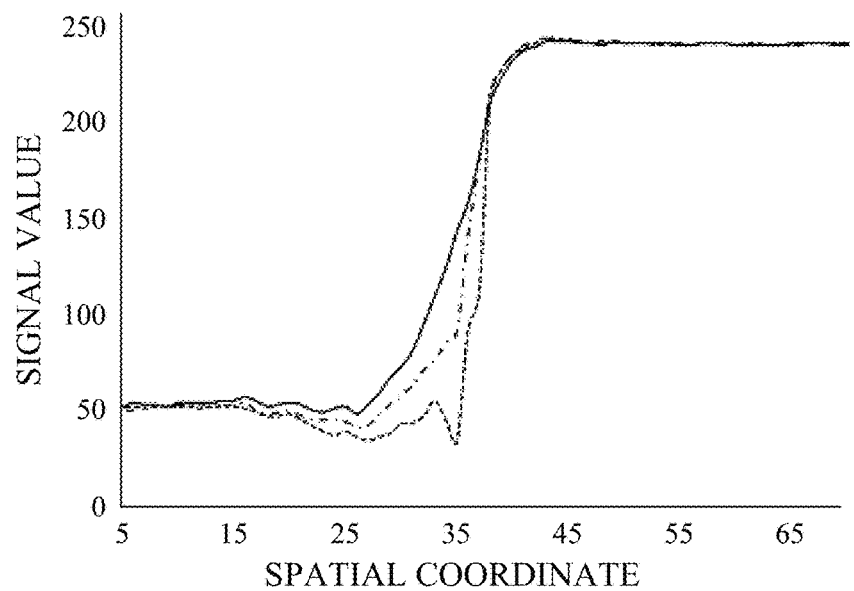
FIGS. 4A to 4C are explanatory diagrams illustrating side effects caused by sharpening according to the first to fourth embodiments.
Figure 4B:
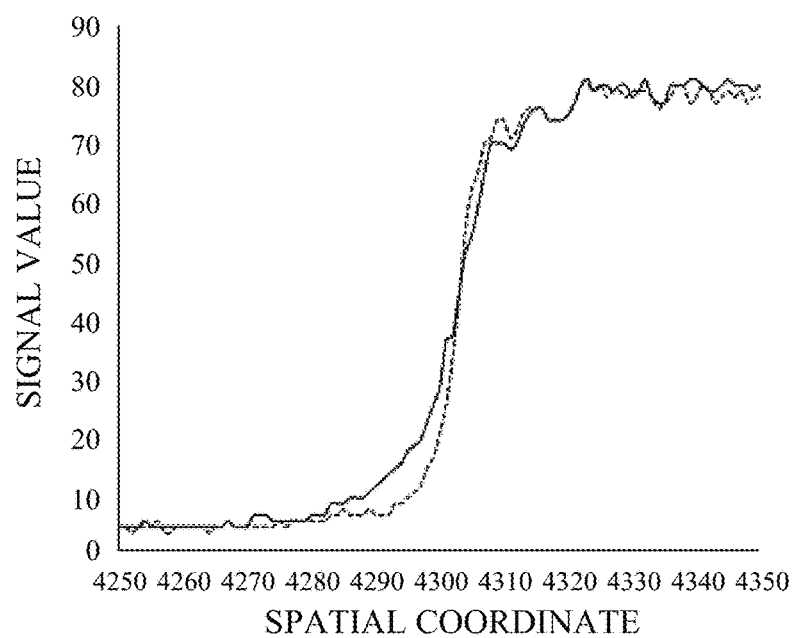
Figure 4C:
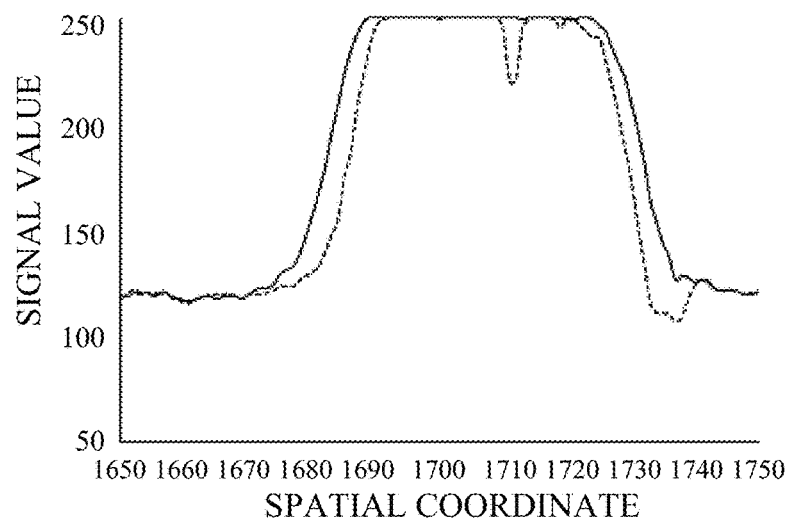

Next, with reference to FIGS. 4A to 4C, a description is given of decrease in estimation accuracy that occurs when blur sharpening is performed by the machine learning model. FIGS. 4A to 4C are explanatory diagrams of side effects caused by the sharpening, and illustrate spatial changes in signal values of images. Here, the images are developed images of 8 bits, and therefore saturation values are 255. In each of FIGS. 4A to 4C, a solid line represents a captured image (blurred image), and a dotted line represents a deblurred image in which the blur of the captured image is sharpened by using the machine learning model.

FIG. 4A is a result of sharpening performed on a non-luminance saturated object greatly blurred by aberration of the optical system, FIG. 4B is a result of sharpening performed on a non-luminance saturated object slightly blurred by aberration of the optical system, and FIG. 4C is a result of sharpening performed on a luminance saturated object slightly blurred by aberration of the optical system. In a case where the image is greatly burred by aberration of the optical system, undershoot occurs on a dark side of an edge. Also, even in a case where the image is slightly blurred by aberration of the optical system, if the luminance saturated object is sharpened, there are occurrences of undershoot that does not occur in the non-luminance saturated object and a side effect by which an originally saturated pixel value is decreased. In an area in which luminance is saturated (hereinafter referred to as "luminance saturated area"), information on a structure of an object space is lost, and a false edge may appear at a boundary of each area, making it impossible to extract a correct feature amount of the object. As a result, the estimation accuracy of the machine learning model decreases. These results indicates that the side effect caused by sharpening depends on the performance of the optical system and the luminance saturated area.

The above-described correction uses a machine learning model that has performed learning by incorporating a method of using, as input data of the machine learning model, a captured image and a luminance saturation map corresponding to the captured image and a method of generating a saturation effect map. That is, although the side effect can be reduced by using these methods, it is difficult to completely eliminate the side effect. Detailed descriptions are given of the method of using the luminance saturation map and the method of generating the saturation effect map.

A description is given of the luminance saturation map. The luminance saturation map is a map indicating (representing, illustrating, or identifying) a luminance saturated area in a captured image. In an area in which luminance is saturated (hereinafter also referred to as "luminance saturated area), information on a structure of an object space is lost and a false edge may appear at a boundary of each area, making it impossible to extract a correct feature value of the object. By inputting the luminance saturation map, the neural network can identify such a problematic area as described above and hinders estimation accuracy from being deteriorated.

Next, a description is given of the saturation effect map. Even when the luminance saturation map is used, the machine learning model may not correctly make a determination. For example, if a target area is in the vicinity of the luminance saturated area, the machine learning model can determine that the target area is an area affected by the luminance saturation because there is a luminance saturated area near the target area. On the other hand, if the target area is located at a position far from the luminance saturated area, it is not easy to determine whether or not the target area is affected by the luminance saturation, and the ambiguity becomes high. As a result, the machine learning model may make an erroneous determination at a position far from the luminance saturated area. Consequently, in a case where a task is the blur sharpening, sharpening processing for a saturated blurred image is executed on a non-saturated blurred image. At this time, an artifact occurs in a deblurred image, which reduces the accuracy of the task. Therefore, the machine learning model may generate a saturation effect map from a blurred captured image.

The saturation effect map is a map (spatial arrangement of signal sequences) indicating (representing, illustrating, or identifying) a size and a range of a signal value of a blurred and spread object in a luminance saturated area of a captured image. In other words, the saturation effect map is information based on a saturated area in the captured image. By being caused to generate a saturation effect map, the machine learning model can accurately estimate the presence or absence and extent of the effect of the luminance saturation in the captured image. By generating the saturation effect map, the machine learning model can execute, on respective proper areas, processing to be executed on an area or area affected by the luminance saturation and processing to be executed on the other area. Therefore, in a case where the machine learning model is caused to generate a saturation effect map, the accuracy of the task is improved as compared with a case where the generation of the saturation effect map is not involved, i.e., a case where only a recognition label and a deblurred image are generated directly from the captured image.

Although the above-described two methods are effective, it is difficult to completely eliminate the side effect as described with reference to FIGS. 4A to 4C. Thus, the side effect is reduced by obtaining a weighted mean of the captured image and the deblurred image. An alternate-long-and-short-dash line in FIG. 4A represents a signal value acquired by obtaining a weighted mean of the captured image and the deblurred image. By obtaining the weighted mean, the undershoot of the dark part is reduced while the blur sharpening effect is maintained. This embodiment generates a weight map (weight information) to be used to obtain the weighted mean of the captured image and the deblurred image, based on information on brightness of the captured image or information on a scene of the captured image, and information based on the saturated area (information on the saturated area). Thereby, a correction effect is maintained in a dark image in which undershoot is inconspicuous and is reduced in a bright image in which undershoot is conspicuous so that a side effect is reduced. That is, it is possible to maintain the blur correction effect (deblurring effect) while a side effect that occurs around a saturated area and is different depending on a scene is reduced.

Figure 5:
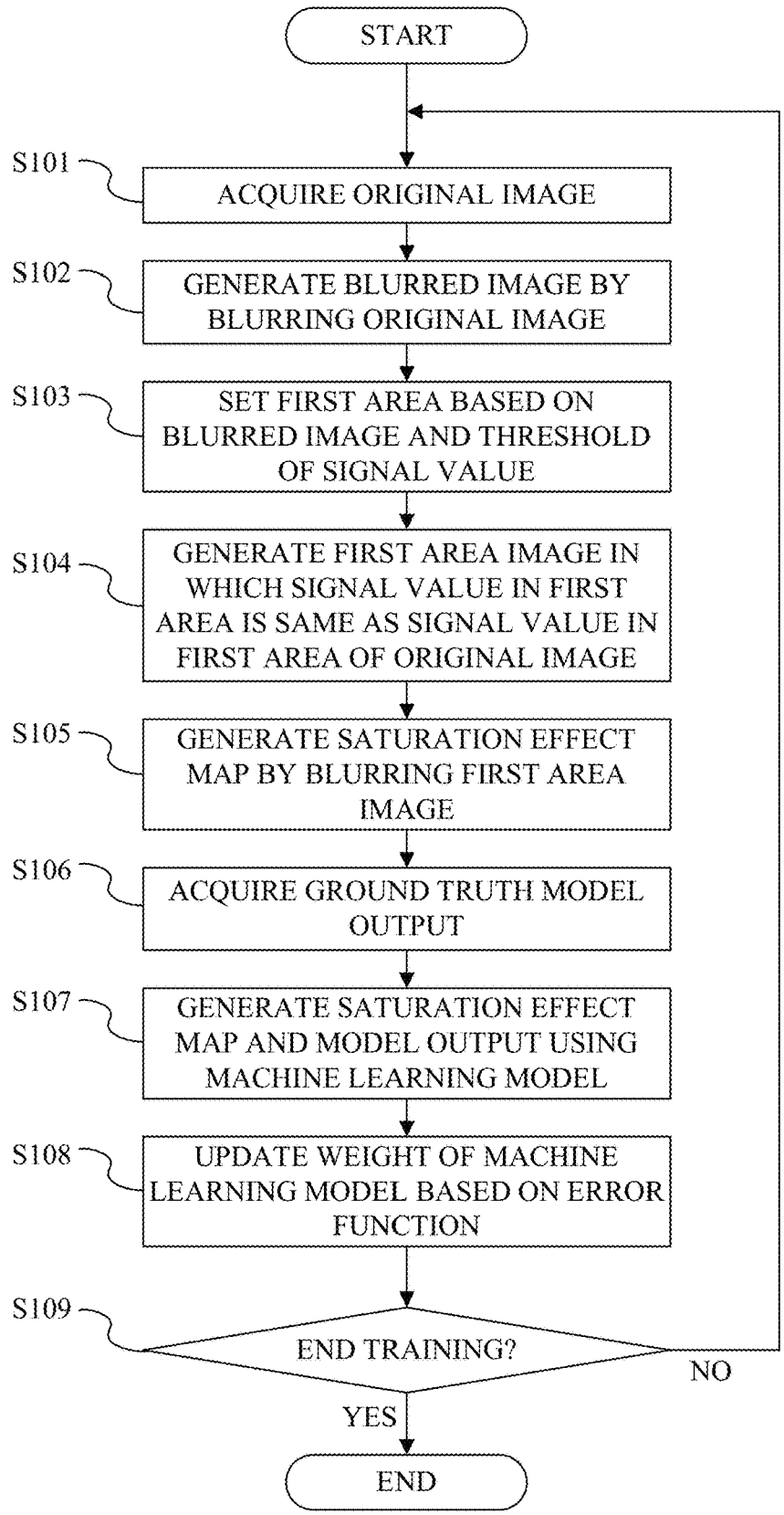
FIG. 5 is a flowchart of machine learning model training according to the first, third, and fourth embodiments.

Next, with reference to FIG. 5, a description is given of training of the machine learning model executed by the training apparatus 101. FIG. 5 is a flowchart of the training of the machine learning model. The training apparatus 101 includes the memory 101a, an acquiring unit 101b, a calculating unit 101c, and an updating unit 101d, and these units execute the following steps.

First, in step S101, the acquiring unit 101b acquires one or more original images from the memory 101a. An original image is an image including a signal value higher than a second signal value. The second signal value is a signal value corresponding to a luminance saturated value of a captured image. The signal value may be normalized when being input to the machine learning model, and thus the second signal value and the luminance saturated value of the captured image may not necessarily have to match. The training of the machine learning model is performed based on the original image, and therefore the original image may be an image including various frequency components (edges having different orientations and intensities, gradations, flat portions, etc.). The original image may be a live-action image or computer graphics (CG).

Subsequently, in step S102, the calculating unit 101c generates a blurred image by blurring the original image. The blurred image is an image to be input to the machine learning model during the training and corresponds to a captured image during the estimation. The applied blur is blur that is the target of the sharpening. In this embodiment, the blur may refer to blur caused by aberration and diffraction of the optical system 102a and the optical low pass filter of the image sensor 102b. Shapes of blur caused by aberration and diffraction of the optical system 102a change depending on image plane coordinates (image height and azimuth). The shapes also change depending on states of magnification variation, diaphragm, and focus of the optical system 102a. If the training is to be performed at once in the machine learning model that sharpens all of these types of blur, a plurality of blurred images may be generated by using a plurality of types of blur that occur in the optical system 102a. In the blurred image, signal values exceeding the second signal value are clipped so that luminance saturation is reproduced, the luminance saturation occurring during an imaging process of the captured image. If necessary, noise generated by the image sensor 102b may be applied to the blurred image.

Subsequently, in step S103, the calculating unit 101c sets a first area based on a threshold of the signal value and an image based on the original image. In this embodiment, the blurred image is used as the image based on the original image, but the original image itself may be used. The first area is set by comparing the signal value of the blurred image with the threshold of the signal value. More specifically, the first area is an area where the signal value of the blurred image is equal to or larger than the threshold of the signal value. In the first embodiment, the threshold of the signal value is the second signal value. Therefore, the first area indicates (represents, includes, or identifies) the luminance saturated area of the blurred image. However, the threshold of the signal value and the second signal value may not match. The threshold of the signal value may be set to a value slightly smaller than the second signal value (for example, 0.9 times the second signal value).

Subsequently, in step S104, the calculating unit 101c generates a first area image in which a signal value in the first area is the same as the signal value in the first area of the original image. In the first area image, a signal value in an area other than the first area is different from the signal value in an area other than the first area of the original image. The first area image may have a first signal value in an area other than the first area. In this embodiment, the first signal value is 0, but the present invention is not limited to this. In the first embodiment, in the first area image, the blurred image has the signal value of the original image only in the luminance saturated area, and the signal value is 0 in the other areas.

Subsequently, in step S105, the calculating unit 101c generates a saturation effect ground truth map by blurring the first area image. The applied blur is the same as the blur applied to the blurred image. Thereby, the saturation effect ground truth map is generated based on the object in the luminance saturated area of the blurred image, the saturation effect ground truth map being a map (a spatially arranged signal sequence) indicating (representing, illustrating, or identifying) a size and a range of a signal value that has spread by degradation during imaging (a relationship between a range of an area in which an object in the saturated area has been spread by the blur component and a signal value corresponding to the area). In the first embodiment, the saturation effect ground truth map is clipped at the second signal value in a similar manner as the clipping of the blurred image, but may not be clipped.

Subsequently, in step S106, the acquiring unit 101b acquires ground truth model output. In this embodiment, since the task is the blur sharpening, the ground truth model output is an image having less blur than the blurred image. In the first embodiment, the ground truth model output is generated by clipping the original image at the second signal value. If the original image does not include sufficient high-frequency components, an image acquired by reducing the original image may be used as the ground truth model output. In this case, the reduction is also performed similarly in the generation of the blurred image in step S102. Step S106 may be executed at any time after step S101 and before step S107.

Subsequently, in step S107, by using the machine learning model, the calculating unit 101c generates a saturation effect map and model output based on the blurred image. FIG. 1 is a configuration diagram of the machine learning model. In this embodiment, the machine learning model illustrated in FIG. 1 is used, but the present invention is not limited to this. A blurred image 201 and a luminance saturation map 202 are input to the machine learning model. The luminance saturation map 202 is a map indicating (representing, illustrating, or identifying) a luminance saturated area of the blurred image 201, the luminance saturated area being an area in which a signal value is equal to or larger than the second signal value. The luminance saturation map 202 can be generated by, for example, binarizing the blurred image 201 with the second signal value. However, the luminance saturation map 202 is not essential. The blurred image 201 and the luminance saturation map 202 are concatenated in a channel direction and input to the machine learning model. However, the present invention is not limited to this. For example, each of the blurred image 201 and the luminance saturation map 202 may be converted into a feature map, and the feature maps may be concatenated in the channel direction. Information other than the luminance saturation map 202 may be added to the input.

The machine learning model includes a plurality of layers and obtains a linear sum of input to a layer and a weight in each layer. An initial value of the weight may be determined by a random number or the like. In the first embodiment, the machine learning model is a CNN that uses, as the linear sum, a convolution of the input and a filter (a value of each element of the filter corresponds to the weight, and the convolution may include a sum with a bias), but the present invention is not limited to this. In each layer, as needed, a non-linear conversion is executed using an activation function such as a rectified linear unit (ReLU) and a sigmoid function. Further, the machine learning model may include a residual block or a skip connection (also referred to as a shortcut connection), if necessary. After the input passes through the plurality of layers (16 convolutional layers in this embodiment), a saturation effect map 203 is generated. In this embodiment, the saturation effect map 203 is acquired by obtaining a sum of output of a layer 211 and the luminance saturation map 202 for each element, but the present invention is not limited to this. The saturation effect map may be generated directly as the output of the layer 211. Alternatively, the result of arbitrary processing performed on the output of the layer 211 may be used as the saturation effect map 203.

Subsequently, the saturation effect map 203 and the blurred image 201 are concatenated in the channel direction and input to subsequent layers and pass through a plurality of layers (16 convolutional layers in the first embodiment). As a result, model output 204 is generated. The model output 204 is generated by obtaining a sum of output of a layer 212 and the blurred image 201 for each element, but the configuration is not limited to this. In the first embodiment, in each layer, a convolution with 64 types of 3×3 filters (however, the number of filter types in the layers 211 and 212 is the same as the number of channels of the blurred image 201) is executed, but the present invention is limited to this.

Subsequently, in step S108, the updating unit 101d updates the weight of the machine learning model based on an error function. In the first embodiment, the error function is a weighted sum of an error between the saturation effect map 203 and the saturation effect ground truth map and an error between the model output 204 and the ground truth model output. Mean Squared Error (MSE) is used to calculate the errors. The weight is 1 for each. However, the error function and weight are not limited to these. Backpropagation or the like may be used for updating the weight. The errors may be obtained with respect to a residual component. In the case of the residual component, an error to be used is an error between a difference component between the saturation effect map 203 and the luminance saturation map 202 and a difference component between the saturation effect ground truth map and the luminance saturation map 202. Similarly, an error between a difference component between the model output 204 and the blurred image 201 and a difference component between the ground truth model output and the blurred image 201 is used.

Subsequently, in step S109, the updating unit 101d determines whether or not the training of the machine learning model has been completed. The completion can be determined by whether or not the number of repetitions of weight updates has reached a predetermined number, whether an amount of change in the weight at the time of update is smaller than a predetermined value, or the like. If it is determined in step S109 that the training has not been completed, the process returns to step S101, and the acquiring unit 101b acquires one or more new original images. On the other hand, if it is determined that the training has been completed, the updating unit 101d ends the training and stores information on a configuration and the weight of the machine learning model in the memory 101a.

With the above training method, the machine learning model can estimate the saturation effect map that indicates (representing, illustrating, or identifying) the size and the range of the signal value of the blurred and spread object in the luminance saturated area of the blurred image (captured image at the time of estimation). By explicitly estimating the saturation effect map, the machine learning model can execute, on respective proper areas, blur sharpening for saturated blurred images and for non-saturated blurred images, which makes it possible to hinder the occurrence of artifacts.

Figure 6:
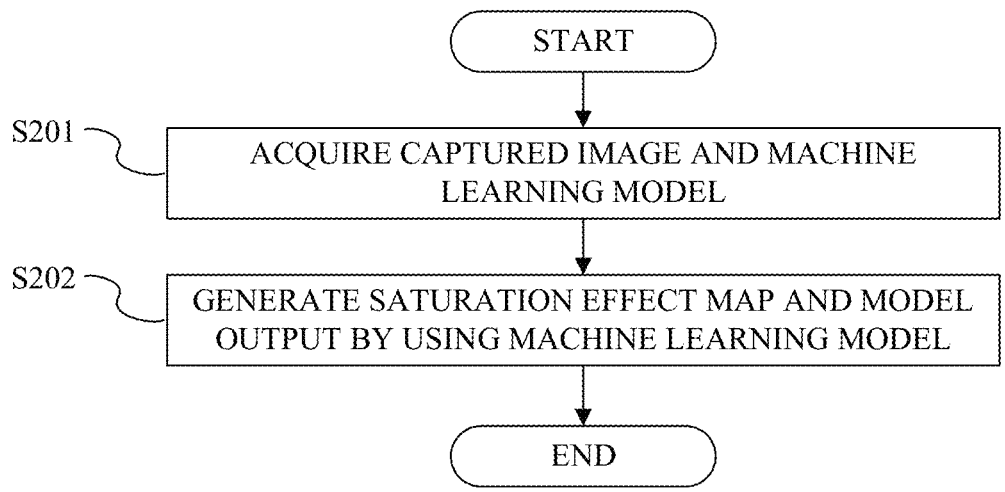
FIG. 6 is a flowchart of model output generation according to the first or third embodiment.

Next, with reference to FIG. 6, a description is given of blur sharpening for a captured image using the trained machine learning model, the blur sharpening being executed by the image processing apparatus 103. FIG. 6 is a flowchart of model output generation. The image processing apparatus 103 includes the memory 103a, an acquiring unit (acquiring task) 103b, and a sharpening unit (first generating unit, second generating unit, first generating task, second generating task) 103c, and these units execute the following steps.

First, in step S201, the acquiring unit 103b acquires the machine learning model and a captured image acquired through the optical system 102a. The information on the configuration and the weight of the machine learning model is acquired from the memory 103a. Subsequently, in step S202, by using the machine learning model, the sharpening unit (first generating unit, first generating task) 103c generates a deblurred image (model output, first image) in which blur of the captured image is sharpened, from the captured image. That is, the sharpening unit 103c generates a first image by correcting a blur component of the captured image. The machine learning model has the configuration illustrated in FIG. 1 as in the case of training. As in training, a saturation effect map and model output are generated by generating and inputting a luminance saturation map that indicates (represents, illustrates, or identifies) a luminance saturated area of the captured image.

Figure 7:
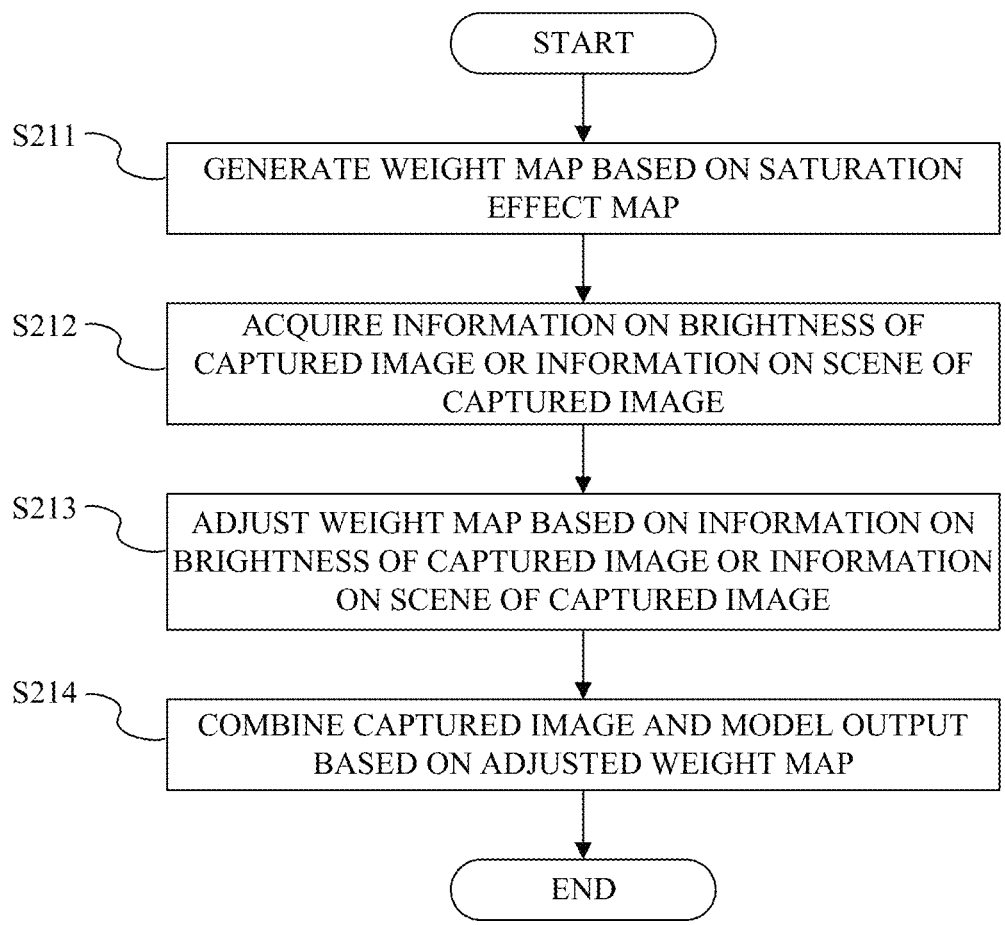
FIG. 7 is a flowchart of sharpening intensity adjustment according to the first to fourth embodiments.

Next, with reference to FIG. 7, a description is given of combining the captured image and the model output (adjusting sharpening intensity) performed by the image processing apparatus 103. FIG. 7 is a flowchart of sharpening intensity adjustment.

First, in step S211, the sharpening unit 103c generates a weight map used in combining the captured image and the model output based on the saturation effect map. The generation of the weight map is described in detail. A weight map determines a proportion of each image when a weighted mean of the captured image and the deblurred image is to be acquired, and has continuous signal values from 0 to 1. For example, in a case where a value of the weight map determines a proportion of the captured image, if the value is 1, a weighted mean image is the captured image. If the value of the weight map is 0.5, the weighted mean image is an image in which 50% of pixel values of the captured image and 50% of pixel values of the deblurred image area added. In this embodiment, the value of the weight map represents the weight of the captured image. When the weight is to be determined, the saturation effect map is normalized by a set signal value and this is used as the weight map for the captured image. Changing the signal value by which the saturation effect map is normalized can adjust a balance between the blur sharpening effect and the side effect.

In the captured image, an area around the luminance saturated area includes a decrease in object information caused by the luminance saturation, and thus the blur sharpening (estimation of the decreased object information) on that area is difficult as compared with the blur sharpening on the other area. Therefore, around the luminance saturated area, a side effect (ringing, undershoot, etc.) is likely to be caused by blur sharpening. In order that this side effect is suppressed, the model output and the captured image are combined. At this time, by combining them based on the saturation effect map, a side effect can be reduced by increasing the weight of the captured image only around the luminance saturated area where a side effect is likely to occur, while the decrease in the blur sharpening effect is reduced in the non-saturated blur image.

Subsequently, in step S212, the acquiring unit 103b acquires information on brightness of the captured image or information on a scene of the captured image. Here, the information on the brightness of the captured image is a statistical amount relating to a signal value of the captured image, and is information based on at least one of a mean value, a median value, a variance, and a histogram of the signal values of the captured image. The statistical amount relating to the signal value of the captured image, which is information on the brightness of the captured image, may be related to the entire captured image, or may use a statistical amount of each divided area in the captured image (or a third image described below) (a statistical amount relating to each divided area).

The information on the scene of the captured image is information on a type of the scene of the captured image and on an imaging mode used in imaging the captured image. Here, the information is information on the type of the scene such as "daytime" and "night view" or on the imaging mode such as "night view imaging mode", such that a difference in brightness of captured images can be determined. The information on the scene of the captured image may be acquired by determining the scene (determining the type of the scene) of the captured image, or by acquiring information on the type of the scene or on the imaging mode written in the captured image.

In this embodiment, a mean signal value of the captured image is acquired as the information on the brightness of the captured image. However, in a case where the mean signal value of the captured image is acquired, if the captured image includes many saturated areas, a large value is acquired as the mean signal value even when a dark image such as a night view is used, and the image may be determined to be a bright image. Therefore, the mean signal value may be acquired from a third image acquired by removing the saturation effect map from the captured image (a subtraction using the information on the saturated area and the captured image). In a case where the third image is used and the mean signal value is acquired from the non-saturated area in the captured image, it is possible to properly determine whether the captured image is a bright scene or a dark scene.

Subsequently, in step S213, the sharpening unit 103c adjusts the weight map for the captured image based on the information on the brightness of the captured image or the information on the scene of the captured image. That is, the weight map is generated based on the information on the brightness of the captured image or the information on the scene of the captured image, and the information based on the saturated area in the captured image.

In a case where the mean signal value of the captured image (or the third image) is used as the information on the brightness of the captured image, the weight map is adjusted so that the larger the mean signal value (that is, the brighter the captured image (or the third image)), the larger the weight of the captured image. Specifically, a relationship between the mean signal value and an adjustment value of the weight map is stored as a linear function, an adjustment value corresponding to the mean signal value of the captured image is acquired, and the acquired adjustment value is applied to the weight map (the weight map is multiplied by the adjustment value).

Figure 8:
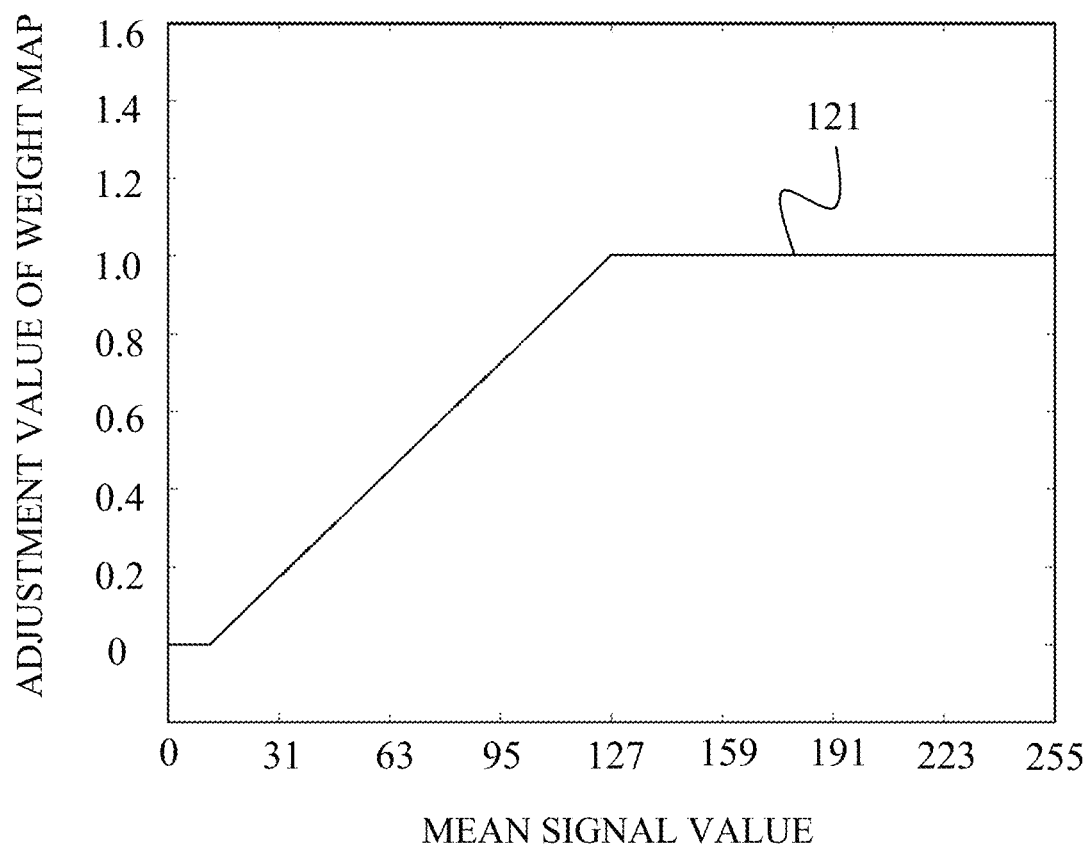
FIG. 8 is an explanatory diagram illustrating an adjustment value of a weight map relative to a mean signal value according to the first to fourth embodiments.

FIG. 8 is an explanatory diagram of the adjustment value of the weight map relative to the mean signal value. In FIG. 8, a horizontal axis represents the mean signal value, and a vertical axis represents the adjustment value of the weight map. For example, an adjustment value corresponding to a mean signal value and acquired from a relationship 121 as illustrated in FIG. 8 is used. However, the relationship between the mean signal value and the weight map adjustment value is not limited to this. In a case where a mean signal value is acquired for each divided area of the captured image, a distribution of the respective mean signal values of the areas may be converted into a mean signal value map representing the mean signal values respectively corresponding to pixels of the captured image, and the weight map may be adjusted by acquiring an adjustment value according to the respective mean signal values in the pixels.

In a case where the information on the scene of the captured image is acquired in step S203, the weight map is adjusted based on, for example, whether or not the captured image is a dark image. For example, if the captured image is a bright image, the weight map is used as it is, and if the captured image is a dark image such as a night view, the weight map is adjusted by halving the values.

In a case where the mean value, the median value, the variance, or the histogram of the signal values of the captured image is acquired as the statistical amount relating to the signal value of the captured image, the weight map is adjusted so that the larger the statistical amount, the larger the weight of the captured image. For example, in a case where the histogram of the signal values of the captured image is used, the weight map is adjusted so that the higher a center of gravity or a peak of the histogram, the larger the weight of the captured image.

Figure 9A:
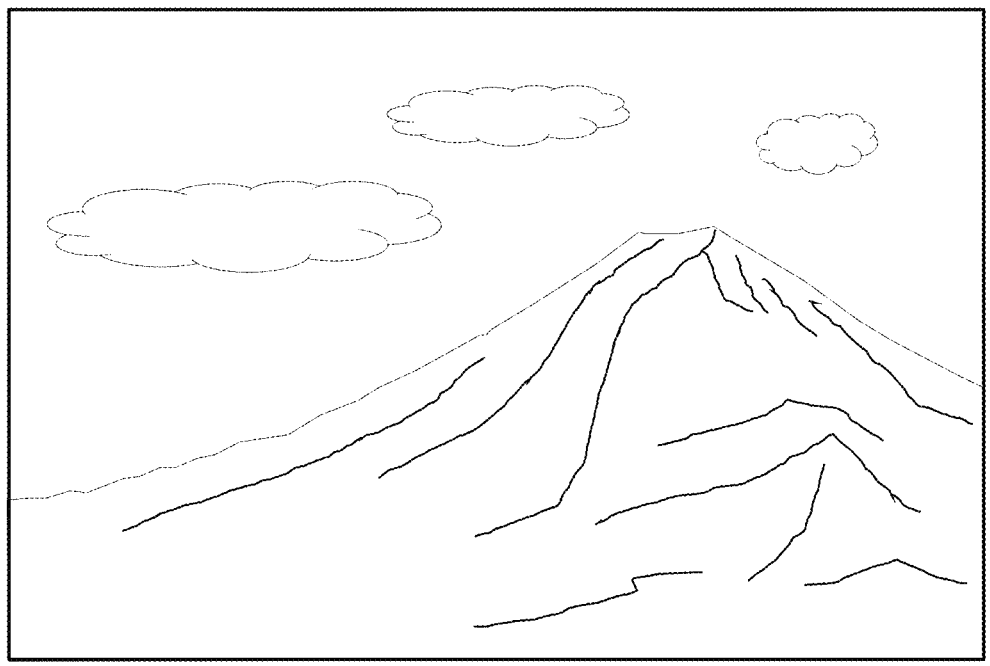
FIGS. 9A and 9B are explanatory diagrams illustrating a captured image and a saturation effect map according to the first embodiment.
Figure 9B:
Figure 10A:
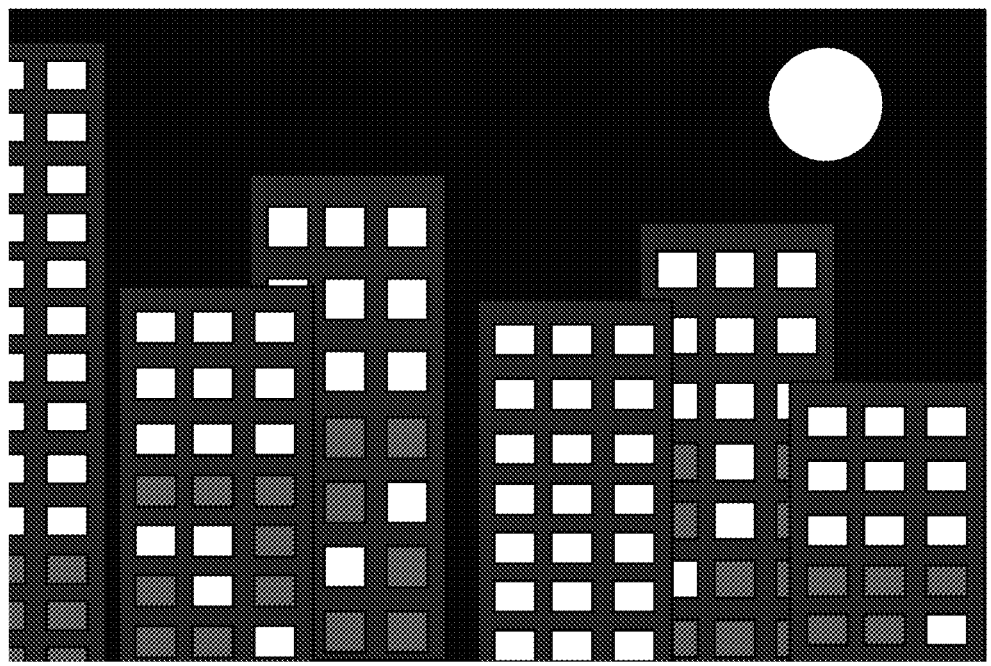
FIGS. 10A and 10B are explanatory diagrams of the captured image and the saturation effect map according to the first embodiment.
Figure 10B:
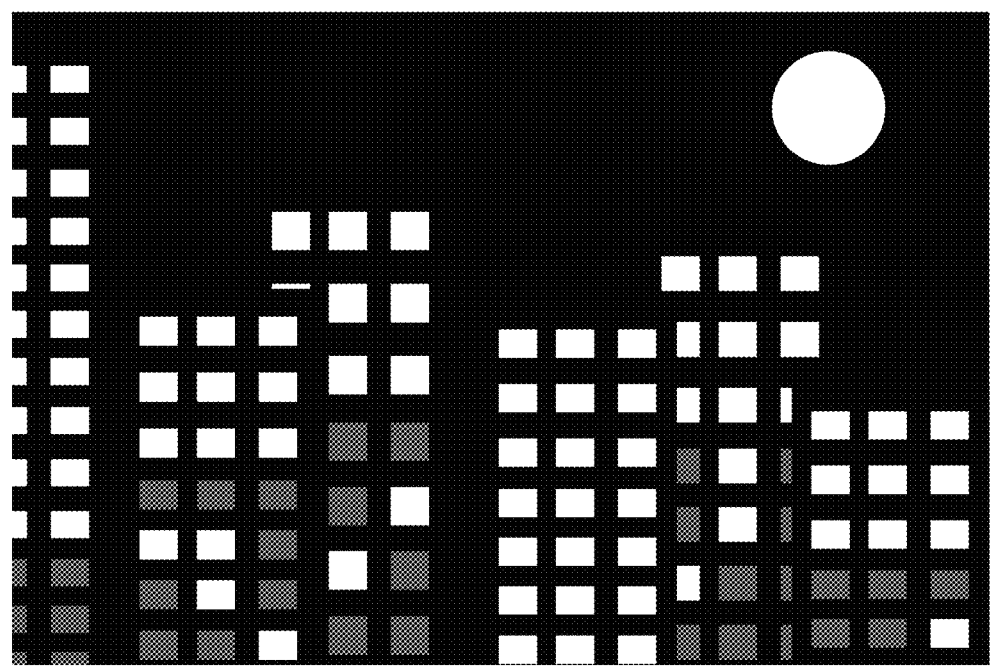
Figure 11:
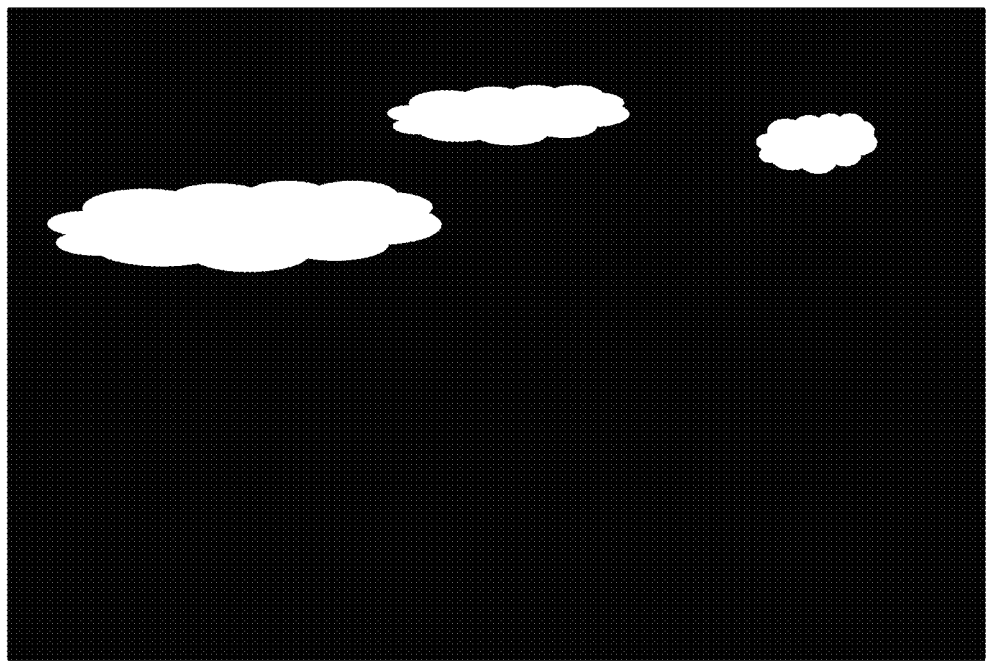
FIG. 11 is an explanatory diagram of the weight map according to the first embodiment.
Figure 12:
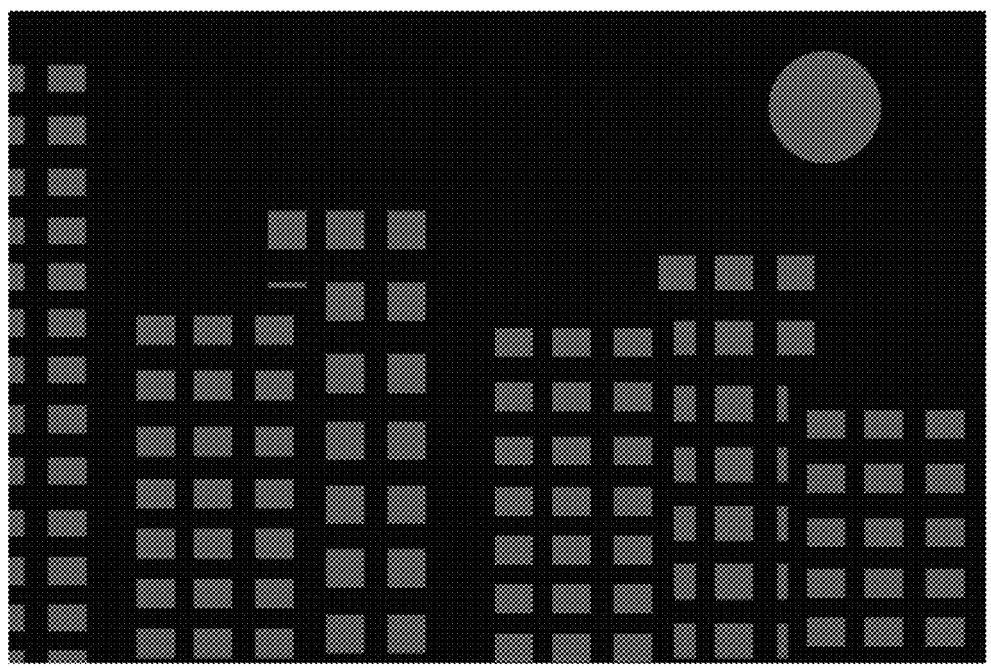
FIG. 12 is an explanatory diagram of the weight map according to the first embodiment.

FIG. 9A illustrates a captured image of a daytime, which is a bright scene, and FIG. 9B illustrates a saturation effect map for the captured image illustrated in FIG. 9A. FIG. 10A illustrates a captured image of a night view, which is a dark scene, and FIG. 10B illustrates a saturation effect map for the captured image illustrated in FIG. 10A. FIG. 11 is a weight map in which the weight based on the saturation effect map illustrated in FIG. 9B of the captured image of the daytime, which is the bright scene, is adjusted according to the mean signal value of the image, and the weight map is greatly adjusted according to the mean signal value of the image. By greatly adjusting the weight map, a conspicuous side effect in the bright scene can be reduced. FIG. 12 is a weight map in which the weight based on the saturation effect map illustrated in FIG. 10B of the captured image of the night view, which is the dark scene, is adjusted according to the mean signal value of the image, and the weight map is slightly adjusted according to the mean signal value of the image. Since the side effect is not conspicuous in the dark scene, the effect can be maintained by slightly adjusting the weight map.

In this embodiment, since the weight map is generated based on the saturation effect map, the weight map is applied to the saturated area and around the saturated area, but a second weight map for a non-saturated area may be used, the second weight map being different from the weight map (first weight map) based on the saturation effect map (first weight map). Further, a third weight map for a saturated area may be applied to the weight map (first weight map) calculated from the saturation effect map. By using the second weight map and the third weight map, intensity can be adjusted for each of the saturated area and the non-saturated area. In that case, the weight map can be calculated as a weight map of (1-first weight map)×second weight map+first weight map×adjustment value×third weight map. Further, the acquired weight map may be adjusted according to a user's instruction. For example, the intensity is adjusted by multiplying the entire weight map by a coefficient.

Subsequently, in step S214, the sharpening unit (second generating unit, second generating task) 103c generates an intensity adjusted image (second image) 205 by obtaining a weighted mean of the captured image and the deblurred image (model output, first image) based on the weight map adjusted in step S213. That is, the sharpening unit 103c generates the second image based on the captured image, the first image, and the weight map. This embodiment uses, for the deblurred image, a weight map acquired by subtracting the weight map for the captured image from a map in which all the value is 1.

With the above configuration, it is possible to provide an image processing system that can generate an image with a proper correction effect around a saturated area according to brightness or a scene, in blur sharpening using a machine learning model.

Second Embodiment

Next, a description is given of an image processing system according to a second embodiment of the present invention. In this embodiment, a description is given of blur sharpening performed by image restoring processing, which is a method different from machine learning.

First, an outline of the image restoring processing is described. When it is assumed that a captured image (deteriorated image) is g (x, y), an original image is f (x, y), and a point spread function PSF, which is a Fourier pair of an optical transfer function OTF, is h (x, y), the following equation (1) is established.

$$g(x,y)=h(x,y)*f(x,y) \quad (1)$$

Here, * represents a convolution (convolution, multiply accumulation), and (x, y) represents coordinates on the captured image.

When the equation (1) is Fourier transformed and converted into a display format on a frequency plane, an equation (2) represented by a product of each frequency is acquired.

$$G(u,v)=H(u,v)\cdot F(u,v) \quad (2)$$

Here, H represents an optical transfer function OTF obtained by Fourier transforming the point spread function PSF (h), and G and F represent functions obtained by respectively Fourier transforming the deteriorated image g and the original image f. (u, v) represent coordinates on a two-dimensional frequency plane, that is, a frequency.

In order that the original image f is acquired from the captured deteriorated image g, both sides may be divided by the optical transfer function H as in the following equation (3).

$$G(u,v)/H(u,v)=F(u,v) \quad (3)$$

Then, by performing an inverse Fourier transform on F (u, v), that is, G (u, v)/H (u, v), and returning it to the real plane, the original image f (x, y) can be acquired as a restored image.

When it is assumed that R is acquired by performing an inverse Fourier transform on H-1, the original image f (x, y) can be similarly acquired by performing a convolution process on the image on the real plane as in the following equation (4).

$$g(x,y)*R(x,y)=f(x,y) \quad (4)$$

Here, R (x, y) is referred to as an image restoring filter. In a case where the image is a two-dimensional image, the image restoring filter R generally becomes a two-dimensional filter having taps (cells) respectively corresponding to pixels of the image. Further, in general, the larger the number of taps (number of cells) of the image restoring filter R, the better restoration accuracy. Therefore, the number of taps that can be realized is set according to required image quality, image processing capability, an aberration characteristic, and the like. Since the image restoring filter R needs to reflect at least the aberration characteristic, the image restoring filter R is different from conventional edge enhancement filters having about three taps for each of horizontal and vertical directions. The image restoring filter R is set based on the optical transfer function OTF, which makes it possible to correct both of deterioration in an amplitude component and deterioration in a phase component with high accuracy.

An actual image includes a noise component, and hence if the image restoring filter R created by obtaining the reciprocal of the optical transfer function OTF as described above is used, the noise component is greatly amplified with restoration of the deteriorated image. This is because in a state where an amplitude of the noise is added to the amplitude component of the image, an MTF (amplitude component) of the optical system is increased so that the MTF is restored to 1 over all frequencies. The MTF, which is amplitude deterioration caused by the optical system, is restored to 1, but at the same time, a power spectrum of the noise also increases, and as a result, the noise is amplified according to the degree of increasing the MTF, i.e., a restoration gain.

Therefore, if noise is included, a good image for viewing cannot be acquired. This is expressed by the following equations (5-1) and (5-2).

$$G(u,v)=H(u,v)\cdot F(u,v)+N(u,v) \quad (5\text{-}1)$$

$$G(u,v)/H=F(u,v)+N(u,v)/H(u,v) \quad (5\text{-}2)$$

Here, N represents the noise component.

For the image including the noise component, there is a method of controlling a degree of restoration according to an intensity ratio SNR of an image signal and a noise signal as in, for example, a Wiener filter represented by the following equation (6).

$$M(u,v) = \frac{1}{H(u,v)} \frac{|H(u,v)|^2}{|H(u,v)|^2 + SNR^2} \quad (6)$$

Here, M (u, v) represents a frequency characteristic of the Wiener filter, and |H (u, v)| represents an absolute value of the optical transfer function OTF, that is, the MTF. In this method, for each frequency, the smaller the MTF, the smaller the restoration gain (degree of restoration), and the larger the MTF, the larger the restoration gain. In general, an MTF of an image pickup optical system is high on a low frequency side and low on a high frequency side, and therefore this method substantially reduces the restoration gain on the high frequency side of the image.

Figure 13:
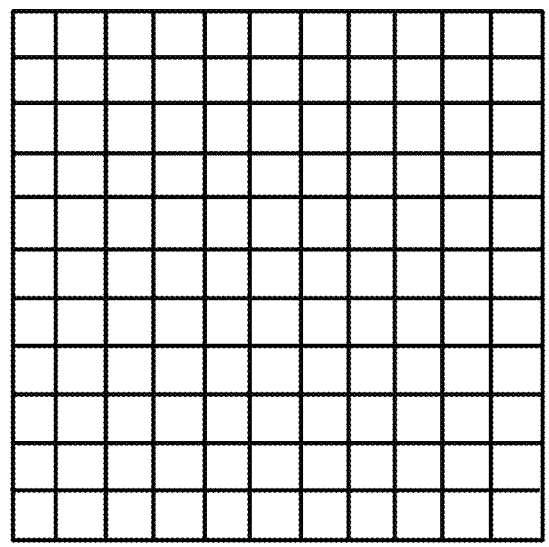
FIG. 13 is an explanatory diagram of an image restoring filter according to the second embodiment.
Figure 14:
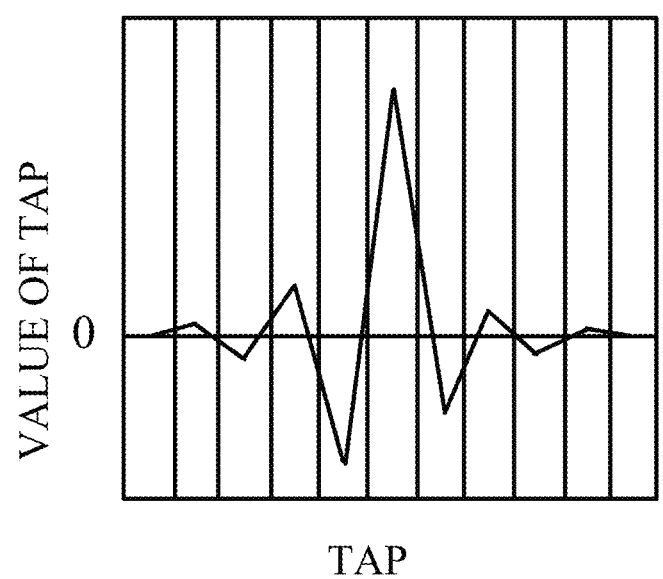
FIG. 14 is an explanatory diagram (sectional view) of the image restoring filter according to the second embodiment.

Subsequently, the image restoring filter is described with reference to FIGS. 13 and 14. FIGS. 13 and 14 are explanatory diagrams of the image restoring filter. The number of taps of the image restoring filter is determined according to the aberration characteristic of the image pickup optical system and a required restoration accuracy. The image restoring filter in FIG. 13 is a two-dimensional filter including 11×11 taps as an example. In FIG. 13, a value (coefficient) of each tap is omitted. One section of this image restoring filter is illustrated in FIG. 14. Ideally, a distribution of the respective values (coefficient values) of taps of the image restoring filter has a function of restoring, to an original one point, the signal value (PSF) spatially spread by the aberration.

The taps of the image restoring filter are subjected to a convolution process (convolution, multiply accumulation) in a process of the image restoring processing while respectively being associated with pixels of the image. In the convolution process, in order that a signal value of a predetermined pixel is improved, that pixel is aligned with the center of the image restoring filter. Then, the signal value of the image and the coefficient value of the filter is multiplied for each corresponding (associated) pixels of the image and the image restoring filter, and the signal value of the central pixel is replaced with the sum of the products.

Figures 15A, 15B:
FIGS. 15A and 15B are explanatory diagrams of a point spread function PSF according to the second embodiment.
Figure 16A:
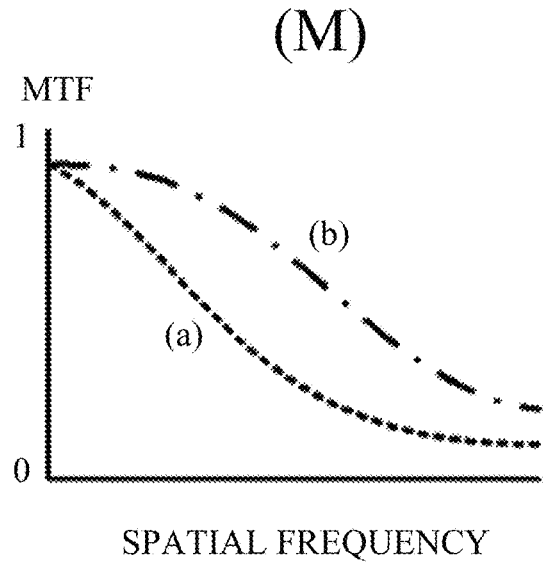
FIGS. 16A and 16B are explanatory diagrams of an amplitude component MTF and a phase component PTF of an optical transfer function according to the second embodiment.
Figure 16B:
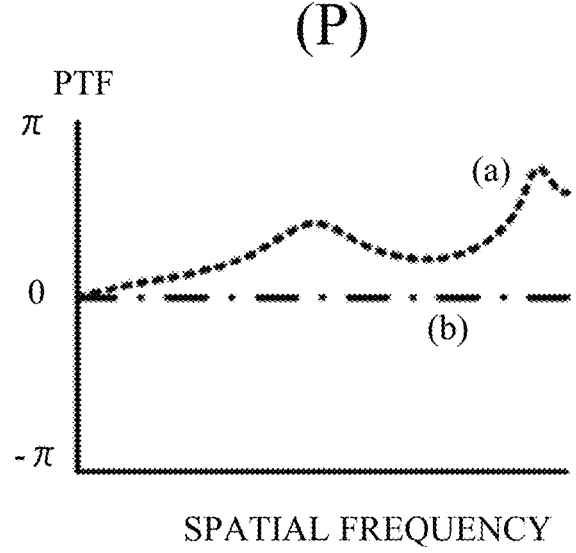

Subsequently, with reference to FIGS. 15A to 16B, a description is given of characteristics of the image restoration in the real space and the frequency space. FIGS. 15A and 15B are explanatory diagrams of point spread functions PSF, FIG. 15A illustrates a point spread function PSF before the image restoration, and FIG. 15B illustrates a point spread function PSF after the image restoration. FIGS. 16A and 16B are explanatory diagrams of amplitude components MTF ((M), FIG. 16A) and phase components PTF ((P), FIG. 16B) of an optical transfer function OTF. In (M) of FIG. 16A, a broken line (a) represents an MTF before the image restoration, and an alternate long and short dash line (b) represents an MTF after the image restoration. In (P) of FIG. 16B, a broken line (a) represents a PTF before the image restoration, and an alternate long and short dash line (b) represents a PTF after the image restoration. As illustrated in FIG. 15A, the point spread function PSF before the image restoration has an asymmetric spread, which causes the phase component PTF to have a non-linear value with respect to the frequency. Since the image restoring processing performs correction such that the amplitude component MTF is amplified and the phase component PTF becomes zero, the point spread function PSF after the image restoration has a symmetric and sharp shape.

As described above, the image restoring filter can be acquired by performing the inverse Fourier transform on a function designed based on the inverse function of the optical transfer function OTF of the image pickup optical system. The image restoring filter used in this embodiment can be changed as appropriate, and for example, the Wiener filter as described above can be used. In a case where the Wiener filter is used, if the inverse Fourier transform is performed on the equation (6), it is possible to create a real-space image restoring filter that is to be actually convolved with an image.

The optical transfer function (OTF) due to aberration changes depending on an image height (image position) of the image pickup optical system even in one imaging state, and therefore the image restoring filter to be used needs to be changed according to the image height. On the other hand, the optical transfer function (OTF) due to diffraction whose effect becomes dominant as an F number increases can be treated as a uniform OTF with respect to the image height, in a case where an effect of vignetting of the optical system is small.

In a case where a correction target of the image restoring processing does not include aberration but is diffraction (diffraction blur), the image restoring filter depends only on an aperture value and a wavelength of light and does not depend on the image height (image position). Therefore, a uniform (the same) image restoring filter can be used for one image. That is, the image restoring filter for correcting the diffraction blur is generated based on the optical transfer function due to the diffraction blur generated according to the aperture value. With respect to the wavelength, an optical transfer function for each color component can be generated by calculating optical transfer functions at a plurality of wavelengths and weighting each wavelength based on a spectrum of an assumed light source or information on a light receiving sensitivity of an image sensor. Alternatively, the calculation may be performed using a predetermined representative wavelength for each color component. Then, an image restoring filter can be generated based on the optical transfer function for each color component.

Therefore, in a case where the correction target is only diffraction, by storing a plurality of image restoring filters depending on aperture values in advance, the processing can be performed by using a uniform (same) image restoring filter for an image according to an imaging condition regarding an aperture value. An opening deterioration component caused by a shape of a pixel opening and characteristics of an optical low-pass filter may be further taken into consideration.

Figure 17:
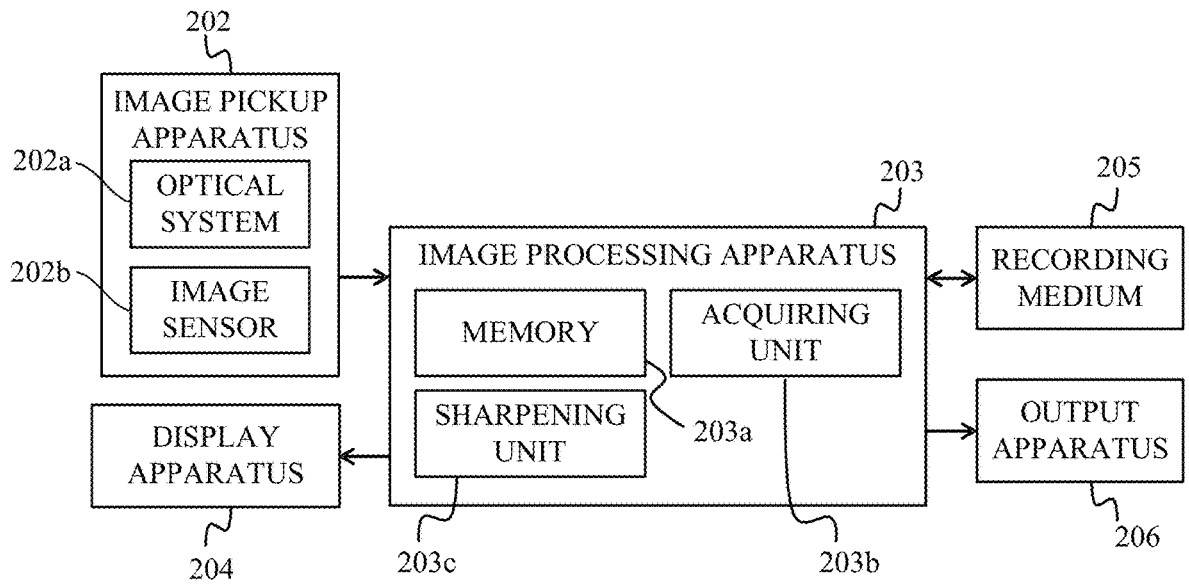
FIG. 17 is a block diagram of an image processing system according to the second embodiment.

Next, an image processing system 200 according to this embodiment is described with reference to FIG. 17. FIG. 17 is a block diagram of the image processing system 200. An external view of the image processing system 200 is as illustrated in FIG. 3 described in the first embodiment. The image processing system 200 includes an image processing apparatus 203 connected via a wired or wireless network. The image processing apparatus 203 is connected to each of an image pickup apparatus 202, a display apparatus 204, a recording medium 205, and an output apparatus 206 via a wired or wireless network.

A captured image acquired by imaging an object space by using the image pickup apparatus 202 is input to the image processing apparatus 203. The captured image is blurred by aberration and diffraction of an optical system 202*a* in the image pickup apparatus 202 and by an optical low-pass filter of an image sensor 202*b* in the image pickup apparatus 202, and information on an object is decreased. The image processing apparatus 203 generates a deblurred image by performing blur sharpening on the captured image by image restoring processing. Further, the image processing apparatus 203 acquires a saturation effect map. The details of the saturation effect map will be described later. The image processing apparatus 203 also has a function of adjusting intensity of blur sharpening by obtaining a weighted mean of the captured image and the deblurred image. A user can adjust the intensity of the blur sharpening while checking the image displayed on a display apparatus 204. The intensity-adjusted deblurred image is stored in a memory 203*a* or the recording medium 205, and is output to the output apparatus 206 such as a printer as needed. The captured image may be grayscale or may include a plurality of color components. The captured image may be an undeveloped RAW image or a developed image.

Figure 18:
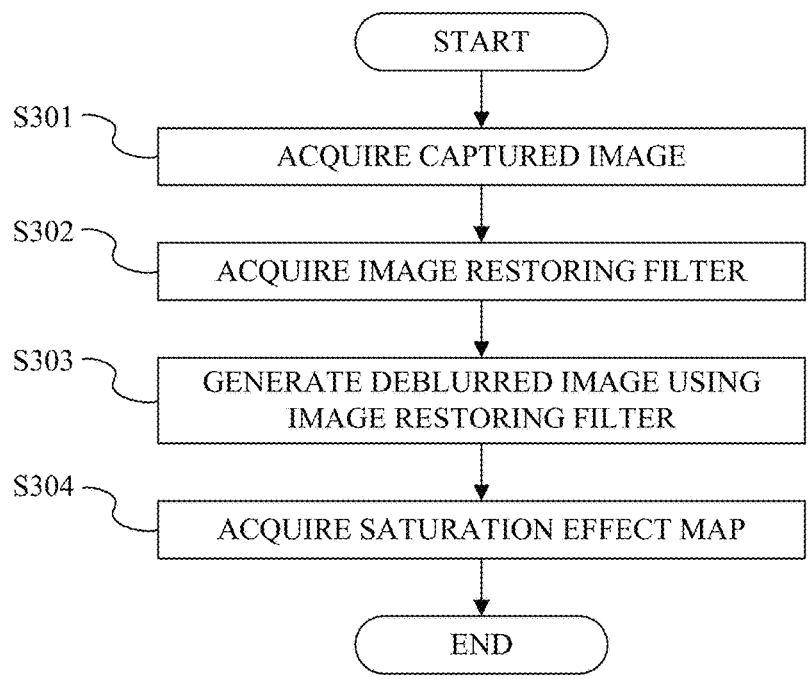
FIG. 18 is a flowchart of deblurred image generation according to the second embodiment.

Next, with reference to FIG. 18, a description is given of the blur sharpening on the captured image performed by the image processing apparatus 203. FIG. 18 is a flowchart of deblurred image generation. The image processing apparatus 203 includes the memory 203a, an acquiring unit 203b, and a sharpening unit 203c, and these members execute the following steps.

First, in step S301, the acquiring unit 203b acquires a captured image. Subsequently, in step S302, the image processing apparatus 203 acquires an image restoring filter to be used for image restoring processing described later. In this embodiment, a description is given of an example in which aberration information (optical information) is acquired based on an imaging condition and an image restoring filter is acquired based on the aberration information.

First, the image processing apparatus acquires the imaging condition (imaging condition information) used when the image pickup apparatus generates the captured image by imaging. The imaging condition includes identification information on the image pickup apparatus (camera ID) in addition to the focal length, the aperture value (F-number), and an imaging distance of the image pickup optical system. Further, in a case of an image pickup apparatus whose image pickup optical system is interchangeable, the imaging condition may include identification information on the image pickup optical system (interchangeable lens) (lens ID). As described above, the imaging condition information may be acquired as information attached to the captured image, or may be acquired via wired or wireless communication or a memory medium.

Subsequently, the image processing apparatus 203 acquires aberration information suitable for the imaging condition. In this embodiment, the aberration information is an optical transfer function OTF. The image processing apparatus selects and acquires a proper optical transfer function OTF according to the imaging condition from a plurality of optical transfer functions OTF stored in advance. Alternatively, in a case where an imaging condition of the aperture value, the imaging distance, the focal length of a zoom lens, or the like is a specific imaging condition, an optical transfer function OTF corresponding to that imaging condition can be generated by an interpolation process from an optical transfer function OTF that is stored in advance and corresponds to the other imaging condition. In this case, it is possible to reduce an amount of data of the optical transfer functions OTF to be stored. As the interpolation process, for example, bilinear interpolation (linear interpolation), bicubic interpolation, or the like is used, but the interpolation process is not limited thereto.

In this embodiment, the image processing apparatus 203 acquires the optical transfer function OTF as the aberration information, but the aberration information is not limited to this. Instead of the optical transfer function OTF, aberration information such as a point spread function PSF may be acquired. Alternatively, in this embodiment, the image processing apparatus may acquire coefficient data by fitting and approximating the aberration information to a predetermined function and may reconstruct an optical transfer function OTF or a point spread function PSF from the coefficient data. For example, the optical transfer function OTF may be acquired by fitting using a Legendre polynomial. Alternatively, other functions such as a Chebushev polynomial may be used in the fitting. In this embodiment, the optical transfer function OTF is discretely disposed at a plurality of positions in the captured image.

Subsequently, the image processing apparatus 203 converts the optical transfer function OTF into an image restoring filter, that is, generates an image restoring filter by using the optical transfer functions OTF disposed at a plurality of positions. The image restoring filter is generated by creating a restoring filter characteristic in a frequency space based on the optical transfer function OTF and converting it into a real space filter (image restoring filter) by inverse Fourier transform.

In a case where the correction target of the image restoring processing is a blur that does not include aberration and does not depend on an image height (image position), such as diffraction (diffraction blur), a uniform (the same) optical transfer function OTF or a uniform (the same) image restoring filter may be used for one image.

The generation and acquisition of the image restoring filter is described above, but the present invention is not limited to this, and the image restoring filter may be generated and stored in advance and acquired based on the imaging condition.

Subsequently, in step S303, the sharpening unit 203c generates a deblurred image (first image) in which blur of the captured image is sharpened, by performing the image restoring processing on the captured image. The image restoring processing is performed based on the image restoring filter acquired in step S302.

In the convolution of the image restoring filter, pixels at positions other than a position on which the image restoring filter is placed can be generated by interpolation using a plurality of filters placed in the vicinity. At this time, the image restoring filter includes a first image restoring filter at a first position in the captured image and a second image restoring filter at a second position in the captured image. The first image restoring filter is generated using an expanded optical transfer function. The second image restoring filter is generated by performing interpolation using the first image restoring filter. By performing such an interpolation process, the image restoring filter can be changed for, for example, each pixel.

Subsequently, in step S304, the sharpening unit 203c estimates a saturation effect map. In this embodiment, the saturation effect map is generated based on a luminance saturated area in the captured image and the aberration information of the image pickup optical system. That is, the saturation effect map is estimated by convolving a PSF, which represents the blur of the image pickup optical system, with a luminance saturation map, which is a map indicating (representing, illustrating, or identifying) the luminance saturated area in the captured image. Information on a structure of the object space is lost in an area in which luminance is saturated (luminance saturated area), and therefore a luminance saturation map acquired by estimating an original signal value in the luminance saturated area may be used.

Next, the image processing apparatus 203 combines the captured image and the deblurred image. Combining the captured image and the deblurred image is as in the flowchart of FIG. 7, and thus a detailed description thereof is omitted. In this embodiment, the image restoring processing is used as a method of the blur sharpening, but the method is not limited to this and may be various sharpening methods such as sharpness and unsharp mask.

With the above configuration, it is possible to provide an image processing system that can generate an image with a proper correction effect around a saturated area according to brightness or a scene in blur sharpening.

Third Embodiment

Figure 19:
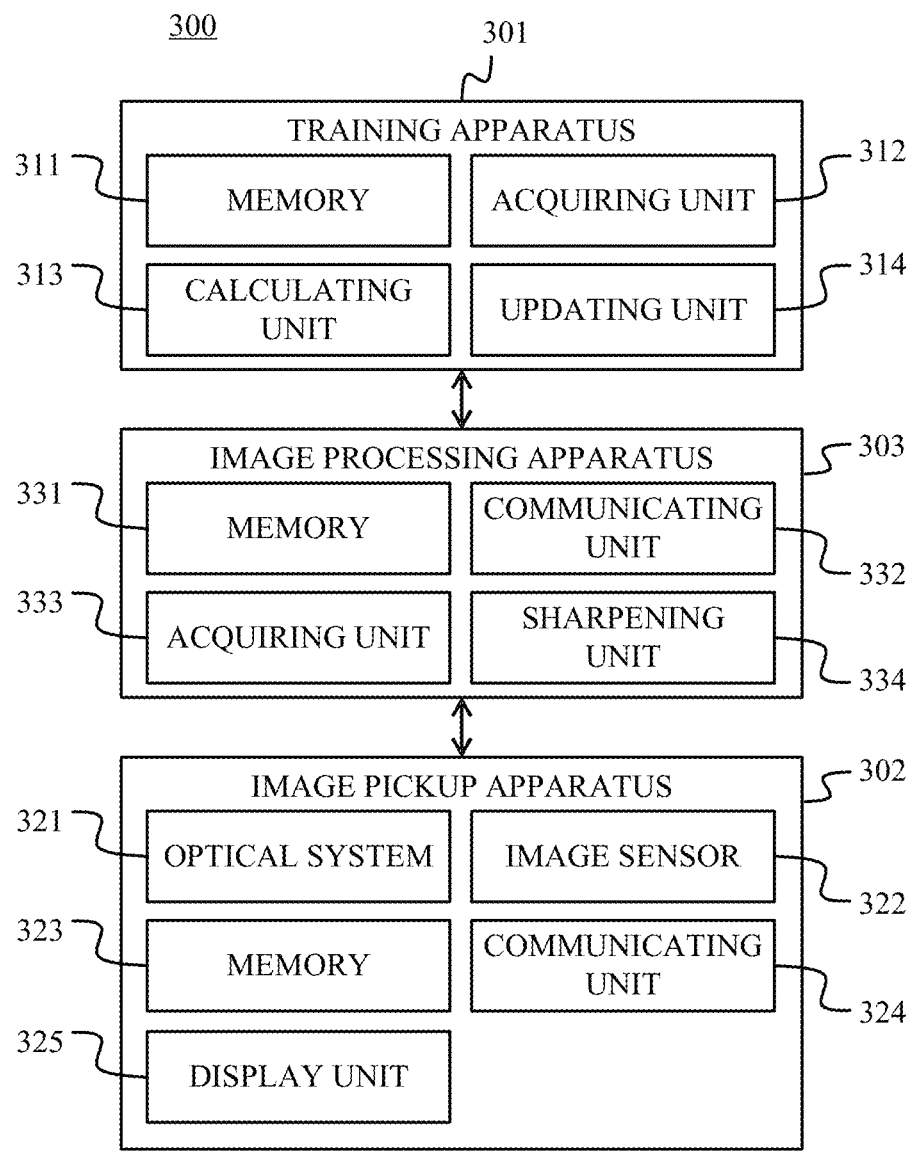
FIG. 19 is a block diagram of an image processing system according to the third embodiment.
Figure 20:
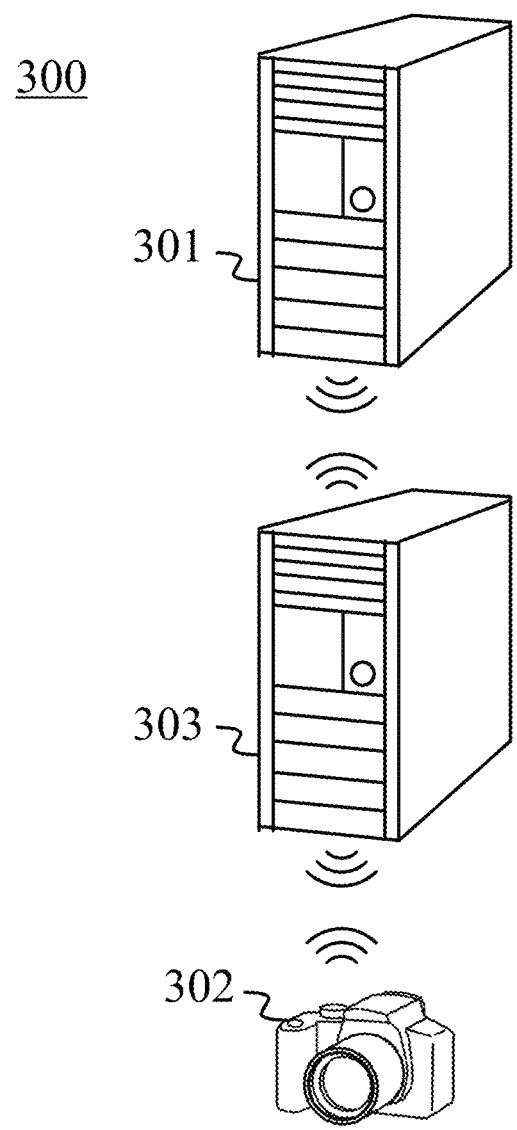
FIG. 20 is an external view of the image processing system according to the third embodiment.

Next, a description is given of an image processing system 300 according to the third embodiment of the present invention. FIG. 19 is a block diagram of the image processing system 300. FIG. 20 is an external view of the image processing system 300. The image processing system 300 includes a training apparatus 301, an image pickup apparatus 302, and an image processing apparatus 303. Wired or wireless networks connect the training apparatus 301 and the image processing apparatus 303, and the image processing apparatus 303 and the image pickup apparatus 302. The image pickup apparatus 302 includes an optical system 321, an image sensor 322, a memory 323, a communicating unit 324, and a display unit 325. A captured image is transmitted to the image processing apparatus 303 via the communicating unit 324.

The image processing apparatus 303 receives the captured image via a communicating unit 332, and performs blur sharpening by using information on a configuration and a weight of a machine learning model stored in a memory 331. The information on the configuration and the weight of the machine learning model has been acquired by training performed by the training apparatus 301, acquired from the training apparatus 301, and stored in the memory 331 in advance. The image processing apparatus 303 has a function of adjusting intensity of the blur sharpening. A deblurred image (model output) in which blur of the captured image has been sharpened and a weighted mean image including adjusted intensity are transmitted to the image pickup apparatus 302, stored in the memory 323, and displayed on the display unit 325.

Generating learning data and learning weight (learning phase) performed by the training apparatus 301 and the blur sharpening on the captured image using the trained machine learning model (estimation phase) and combining the captured image and the model output executed by the image processing apparatus 303 are similar to those in the first embodiment. Therefore, a description thereof is omitted.

With the above configuration, it is possible to provide an image processing system that can generate an image with a proper correction effect around a saturated area according to brightness or a scene in blur sharpening using a machine learning model.

Fourth Embodiment

Figure 21:
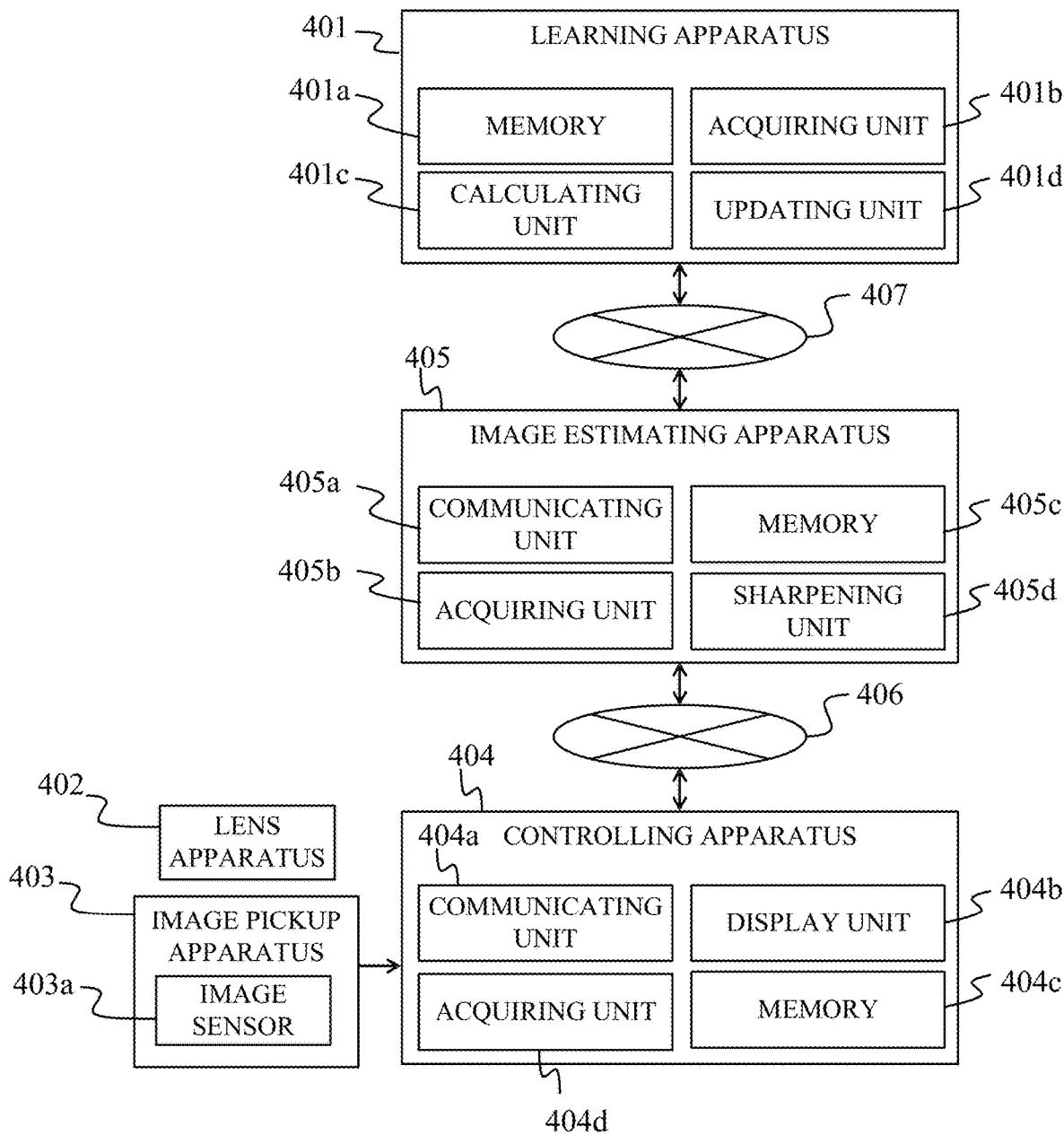
FIG. 21 is a block diagram of an image processing system according to the fourth embodiment.
Figure 22:
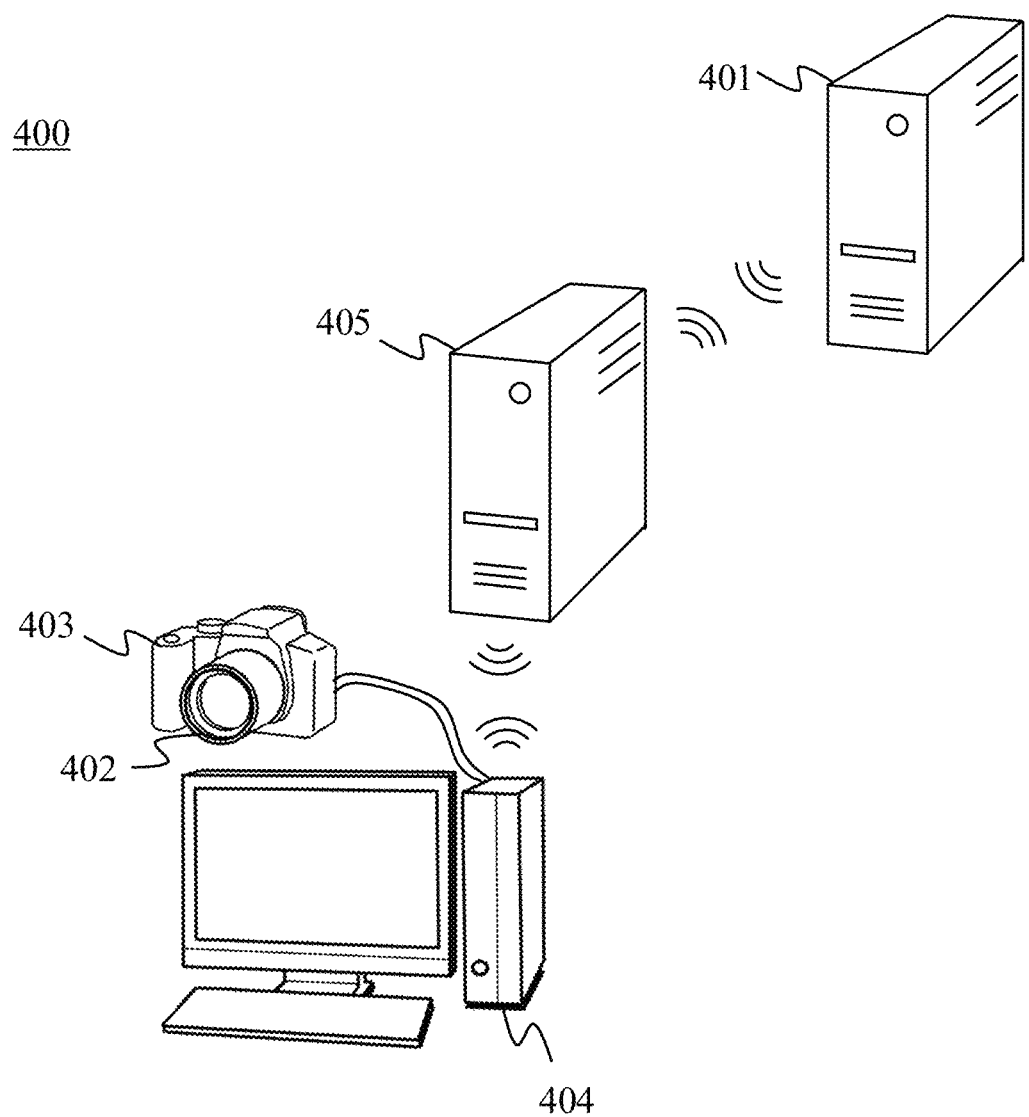
FIG. 22 is an external view of the image processing system according to the fourth embodiment.

Next, a description is given of an image processing system 400 according to a fourth embodiment of the present invention. FIG. 21 is a block diagram of the image processing system 400. FIG. 22 is an external view of the image processing system 400. The image processing system 400 includes a learning apparatus 401, a lens apparatus 402, an image pickup apparatus 403, a controlling apparatus (first apparatus) 404, an image estimating apparatus (second apparatus) 405, and networks 406 and 407. The learning apparatus 401 and the image estimating apparatus 405 are, for example, servers. The controlling apparatus 404 is a device operated by a user such as a personal computer and a mobile terminal. The learning apparatus 401 and the image estimating apparatus 405 can communicate with each other, and the controlling apparatus 404 and image estimating apparatus 405 can communicate with each other.

The learning apparatus 401 includes a memory 401a, an acquiring unit 401b, a calculating unit 401c, and an updating unit 401d, and learns a weight of a machine learning model that performs blur sharpening on a captured image that has been imaged using the lens apparatus 402 and the image pickup apparatus 403. The learning method is similar to the learning method of the first embodiment, and thus a description thereof is omitted. The image pickup apparatus 403 includes an image sensor 403a, and the image sensor 403a photoelectrically converts an optical image formed by the lens apparatus 402 so as to acquire a captured image. The lens apparatus 402 and the image pickup apparatus 403 are detachably attachable to each other, and can be combined with plurality of types of each other.

The controlling apparatus 404 includes a communicating unit 404a, a display unit 404b, a memory 404c, and an acquiring unit 404d, and controls, according to a user's operation, processing to be executed on the captured image acquired from a wired or wirelessly connected image pickup apparatus 403. Alternatively, the captured image imaged by the image pickup apparatus 403 may be stored in the memory 404c in advance, and the controlling apparatus 404 may read the captured image.

The image estimating apparatus 405 includes a communicating unit 405a, an acquiring unit 405b, a memory 405c, and a sharpening unit 405d. The image estimating apparatus 405 executes blur sharpening processing on the captured image according to a request from the controlling apparatus 404 connected via the network 406. The image estimating apparatus 405 acquires information on the learnt weight from the learning apparatus 401 connected via the network 406 at the time of estimation of the blur sharpening or in advance, and uses it for the estimation of the blur sharpening on the captured image. An estimated image after the estimation of the blur sharpening is transmitted to the controlling apparatus 404 again after sharpening intensity is adjusted, stored in the memory 404c, and displayed on the display unit 404b. Generating learning data and learning weight (learning phase) performed by the learning apparatus 401 are as in the first embodiment, and thus a description thereof is omitted.

Figure 23:
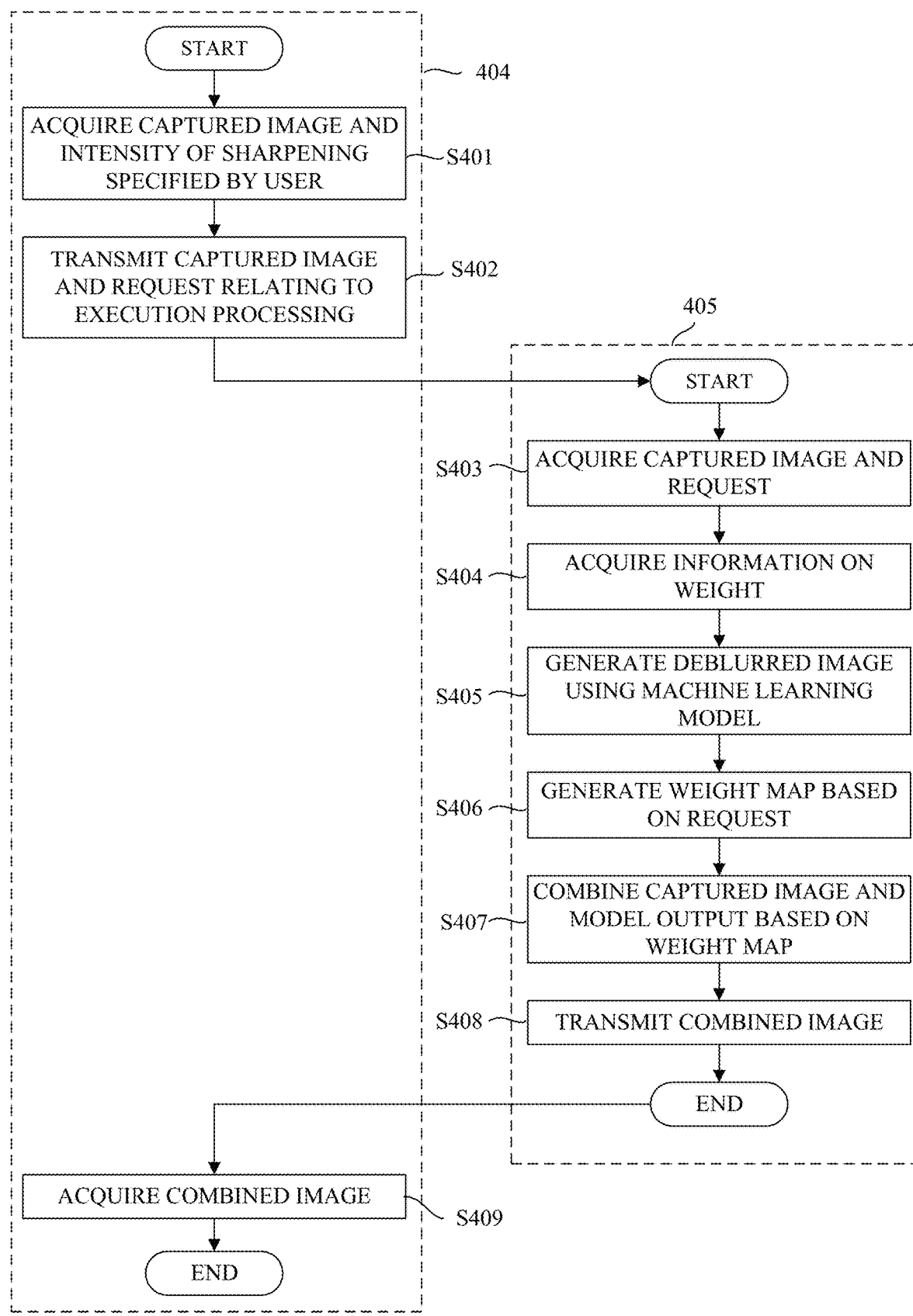
FIG. 23 is a flowchart of model output and sharpening intensity adjustment according to the fourth embodiment.

Next, with reference to FIG. 23, a description is given of the blur sharpening on the captured image executed by the controlling apparatus 404 and the image estimating apparatus 405. FIG. 23 is a flowchart of model output and sharpening intensity adjustment.

First, in step S401, the acquiring unit 404d acquires a captured image and intensity of sharpening specified by the user. Subsequently, in step S402, the communicating unit 404a transmits the captured image and a request relating to execution of blur sharpening estimation processing to the image estimating apparatus 405.

Subsequently, in step S403, the communicating unit 405a receives and acquires the transmitted captured image and request relating to the processing. Subsequently, in step S404, the acquiring unit 405b acquires, from the memory 405c, information on a learnt weight corresponding to (suitable for) the captured image. The weight information is read in advance from the memory 401a and stored in the memory 405c. Subsequently, in step S405, the sharpening unit 405d generates a deblurred image (model output, first image) in which blur of the captured image is sharpened from the captured image by using the machine learning model. The machine learning model has the configuration illustrated in FIG. 1 as in the case of training. As in training, a saturation effect map and model output are generated by generating and inputting a luminance saturation map that indicates (represents, illustrates, or identifies) a luminance saturated area of the captured image.

Subsequently, in step S406, the sharpening unit 405d generates a weight map. The weight map is generated and the captured image and the deblurred image (model output) are combined, by using methods as in the first embodiment. The intensity can be adjusted by adjusting the weight map according to the intensity of sharpening specified by the user. For example, the intensity in the saturated area can be adjusted by changing the relational expression of the mean signal value and the adjustment value illustrated in FIG. 8. Alternatively, in a case where a second weight map relating to an intensity in a non-saturated area and a third map relating to an intensity in a saturated area is used, the intensities in the non-saturated area and the saturated area may be adjusted by adjusting the second and third maps. Alternatively, the entire weight map may be adjusted.

Subsequently, in step S407, the sharpening unit 405d combines the captured image and the deblurred image (model output) based on the weight map. Subsequently, in step S408, the communicating unit 405a transmits the combined image to the controlling apparatus 404. Subsequently, in step S409, the communicating unit 404a acquires the transmitted combined image.

With the above configuration, it is possible to provide an image processing system that can generate an image with a proper correction effect around a saturated area according to brightness or a scene in blur sharpening using a machine learning model.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to each embodiment, it is possible to provide an image processing method, an image processing apparatus, an image processing system, and a memory medium each of which can properly perform deblurring according to brightness or a scene of an image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-101003, filed on Jun. 17, 2021, which is hereby incorporated by reference herein in its entirety.

What is claimed is:

1. An image processing method comprising:
   acquiring a captured image obtained by imaging;
   generating a first image by correcting a blur component of the captured image; and
   generating a second image based on the captured image, the first image, and weight information,
   wherein the weight information is generated based on (i) information on brightness of the captured image or information on a scene of the captured image and (ii) information on a saturated area in the captured image,
   wherein the information on the saturated area is information indicating a relationship between (i) a range of an area in which an object in the saturated area has been spread by the blur component and (ii) a signal value corresponding to the area,
   wherein the weight information is generated based on a third image obtained by a subtraction using the captured image and the information on the saturated area.

2. The image processing method according to claim 1, wherein in generating the first image, the blur component is corrected by inputting the captured image into a machine learning model.

3. The image processing method according to claim 1, wherein the information on the brightness of the captured image is a statistical amount relating to a signal value of the captured image.

4. The image processing method according to claim 3, wherein the statistical amount is at least one of a mean value, a median value, a variance, and a histogram of the signal value.

5. The image processing method according to claim 1, wherein the information on the scene of the captured image is information on a type of the scene of the captured image or information on an imaging mode used in the imaging.

6. The image processing method according to claim 1, wherein the information on the saturated area is acquired by inputting the captured image into a machine learning model.

7. The image processing method according to claim 1, wherein the information on the saturated area is acquired based on the saturated area and optical information on an optical system used in the imaging.

8. The image processing method according to claim 1, wherein the weight information is generated based on a signal value of a pixel among a plurality of pixels in the third image, the pixel corresponding to a pixel in a non-saturated area in the captured image.

9. The image processing method according to claim 1, wherein the weight information is generated based on a statistical amount relating to a signal value of each divided area in the third image.

10. The image processing method according to claim 1, wherein as brightness of the third image increases, a weight of the captured image indicated by the weight information increases.

11. The image processing method according to claim 10, wherein the brightness of the third image is determined based on a mean signal value of the third image.

12. The image processing method according to claim 1, wherein as the brightness of the captured image increases, a weight of the captured image indicated by the weight information increases.

13. The image processing method according to claim 1, wherein the blur component is based on optical information on an optical system used in the imaging.

14. The image processing method according to claim 1, wherein in generating the second image, the second image is generated by obtaining a weighted mean of the captured image and the first image based on the weight information.

15. A non-transitory computer-readable memory medium storing a computer program that causes a computer to execute the image processing method according to claim 1.

16. An image processing apparatus comprising at least one processor or circuit configured to execute a plurality of tasks including:
- an acquiring task configured to acquire a captured image obtained by imaging;
- a first generating task configured to generate a first image by correcting a blur component of the captured image; and
- a second generating task configured to generate a second image based on the captured image, the first image, and weight information,
- wherein the weight information is generated based on (i) information on brightness of the captured image or information on a scene of the captured image and (ii) information on a saturated area in the captured image,
- wherein the information on the saturated area is information indicating a relationship between (i) a range of an area in which an object in the saturated area has been spread by the blur component and (ii) a signal value corresponding to the area, and
- wherein the weight information is generated based on a third image obtained by a subtraction using the captured image and the information on the saturated area.

17. An image processing system comprising: the image processing apparatus according to claim 16 and a controlling apparatus communicable with the image processing apparatus,
- wherein the controlling apparatus includes at least one processor or circuit configured to execute a plurality of tasks including a transmitting task configured to transmit, to the image processing apparatus, a request relating to execution of a process on a captured image obtained by imaging,
- wherein the image processing apparatus includes at least one processor or circuit configured to execute a plurality of tasks including:
- a receiving task configured to receive the request.

18. An image processing method comprising:
- acquiring a captured image obtained by imaging;
- generating a first image by correcting a blur component of the captured image; and
- generating a second image based on the captured image, the first image, and weight information,
- wherein the weight information is generated based on (i) information on brightness of the captured image or information on a scene of the captured image and (ii) information on a saturated area in the captured image,
- wherein in generating the second image, the second image is generated by obtaining a weighted mean of the captured image and the first image based on the weight information.

* * * * *